United States Patent [19]
Bible et al.

[11] Patent Number: 5,961,871
[45] Date of Patent: *Oct. 5, 1999

[54] VARIABLE FREQUENCY MICROWAVE HEATING APPARATUS

[75] Inventors: Don W. Bible, Clinton; Robert J. Lauf, Oak Ridge, both of Tenn.; Arvid C. Johnson, Lake in the Hills, Ill.; Larry T. Thigpen, Angier, N.C.

[73] Assignee: Lockheed Martin Energy Research Corporation, Oak Ridge, Tenn.

[*] Notice: This patent is subject to a terminal disclaimer.

[21] Appl. No.: 08/413,608

[22] Filed: Mar. 30, 1995

Related U.S. Application Data

[63] Continuation-in-part of application No. 08/306,305, Sep. 14, 1994, Pat. No. 5,521,360, which is a continuation-in-part of application No. 08/221,188, Mar. 31, 1994, abandoned, which is a continuation-in-part of application No. 07/792,103, Nov. 14, 1991, Pat. No. 5,321,222.

[51] Int. Cl.$^6$ ...................................................... H05B 6/68
[52] U.S. Cl. .......................... 219/709; 219/716; 219/717; 219/761
[58] Field of Search .................................... 219/709, 716, 219/717, 697, 696, 757, 745, 746, 740, 761

[56] References Cited

U.S. PATENT DOCUMENTS

| | | | |
|---|---|---|---|
| 3,611,135 | 10/1971 | Margerum | 324/85 |
| 3,619,252 | 11/1971 | Roscher et al. | 117/66 |
| 3,681,557 | 8/1972 | Suzuki et al. | 219/757 |
| 3,764,770 | 10/1973 | Saad et al. | 219/746 |
| 3,783,219 | 1/1974 | Tateda | 219/757 |
| 3,806,689 | 4/1974 | Kegereis et al. | 219/10.55 |
| 4,144,468 | 3/1979 | Mourier | 310/72 |
| 4,196,332 | 4/1980 | MacKay et al. | 219/10.55 |
| 4,210,795 | 7/1980 | Lentz | 219/10.55 |
| 4,314,128 | 2/1982 | Chitre | 219/10.55 |
| 4,340,796 | 7/1982 | Yamaguchi et al. | 219/10.55 |
| 4,415,789 | 11/1983 | Nobue et al. | 219/10.55 |
| 4,504,718 | 3/1985 | Okatsuka et al. | 219/10.55 |
| 4,593,167 | 6/1986 | Nilssen | 219/10.55 |
| 4,714,812 | 12/1987 | Haagensen et al. | 219/10.55 |
| 4,771,153 | 9/1988 | Fukushima et al. | 219/10.55 |
| 4,777,336 | 10/1988 | Asmussen | 219/10.55 |
| 4,825,028 | 4/1989 | Smith | 219/10.55 |
| 4,843,202 | 6/1989 | Smith | 219/10.55 |
| 4,866,344 | 9/1989 | Ross et al. | 315/3.5 |
| 4,939,331 | 7/1990 | Berggren et al. | 219/10.55 |
| 5,027,829 | 7/1991 | Larsen | 128/804 |
| 5,033,478 | 7/1991 | Kikuchi | 128/804 |
| 5,241,040 | 8/1993 | Cuomo et al. | 528/353 |
| 5,296,271 | 3/1994 | Swirbel et al. | 427/493 |
| 5,317,081 | 5/1994 | Gelorme et al. | 528/353 |
| 5,321,222 | 6/1994 | Bible et al. | 219/745 |
| 5,406,237 | 4/1995 | Ravas et al. | 333/218 |
| 5,521,360 | 5/1996 | Johnson et al. | 219/709 |

OTHER PUBLICATIONS

McKay, B.A., et al., "Frequency Agile Sources for Microwave Ovens", Journal of Microwave Power, vol. 14(1), 1979, pp. 63–76.

(List continued on next page.)

*Primary Examiner*—Philip H. Leung
*Attorney, Agent, or Firm*—Pitts & Brittian, P.C.

[57] ABSTRACT

A variable frequency microwave heating apparatus (10) designed to allow modulation of the frequency of the microwaves introduced into a multi-mode microwave cavity (34) for testing or other selected applications. The variable frequency microwave heating apparatus (10) includes a microwave signal generator (12) and a high-power microwave amplifier (20) or a high-power microwave oscillator (14). A power supply (22) is provided for operation of the high-power microwave oscillator (14) or microwave amplifier (20). A directional coupler (24) is provided for detecting the direction and amplitude of signals incident upon and reflected from the microwave cavity (34). A first power meter (30) is provided for measuring the power delivered to the microwave furnace (32). A second power meter (26) detects the magnitude of reflected power. Reflected power is dissipated in the reflected power load (28).

32 Claims, 16 Drawing Sheets

OTHER PUBLICATIONS

Swain, B., "Microwave Sintering of Ceramics", Advanced Materials & Processes Incorporating Metal Progress, Sep., 1988, reprinted.

Gerwartowski, J.W., "Traveling–Wave Tube", McGraw–Hill Encyclopedia of Science and Technology, vol. 18, 16th Edition, 1987, pp. 509–511.

El–Sayed, E.M., et al., "Use of Sheath Helix Slow–Wave Structure as an Applicator in Microwave Heating Systems", Journal of Microwave Power, 16(3&4), 1981, pp. 283–288.

Lewis, D.A., et al., "Accelerated Imidization Reactions Using Microwave Radiation", J. Polymer Sci.: Part A: Polymer Chem., vol. 30, 1922, pp. 1647–1653.

Lauf, R. J., et al., Polymer Curing in a Variable Frequency Microwave Oven, 28th Microwave Power Symposium, Montreal, Can., Jul. 12–14, 1993.

Rudder, R., et al., Diamond Chemical Vapor Deposition (CVD) Via Microwave–Excited Plasma From Water–Ethanol Solutions:, Am. Cer. Soc. Spring Meeting, Cincinnati, OH., 1993.

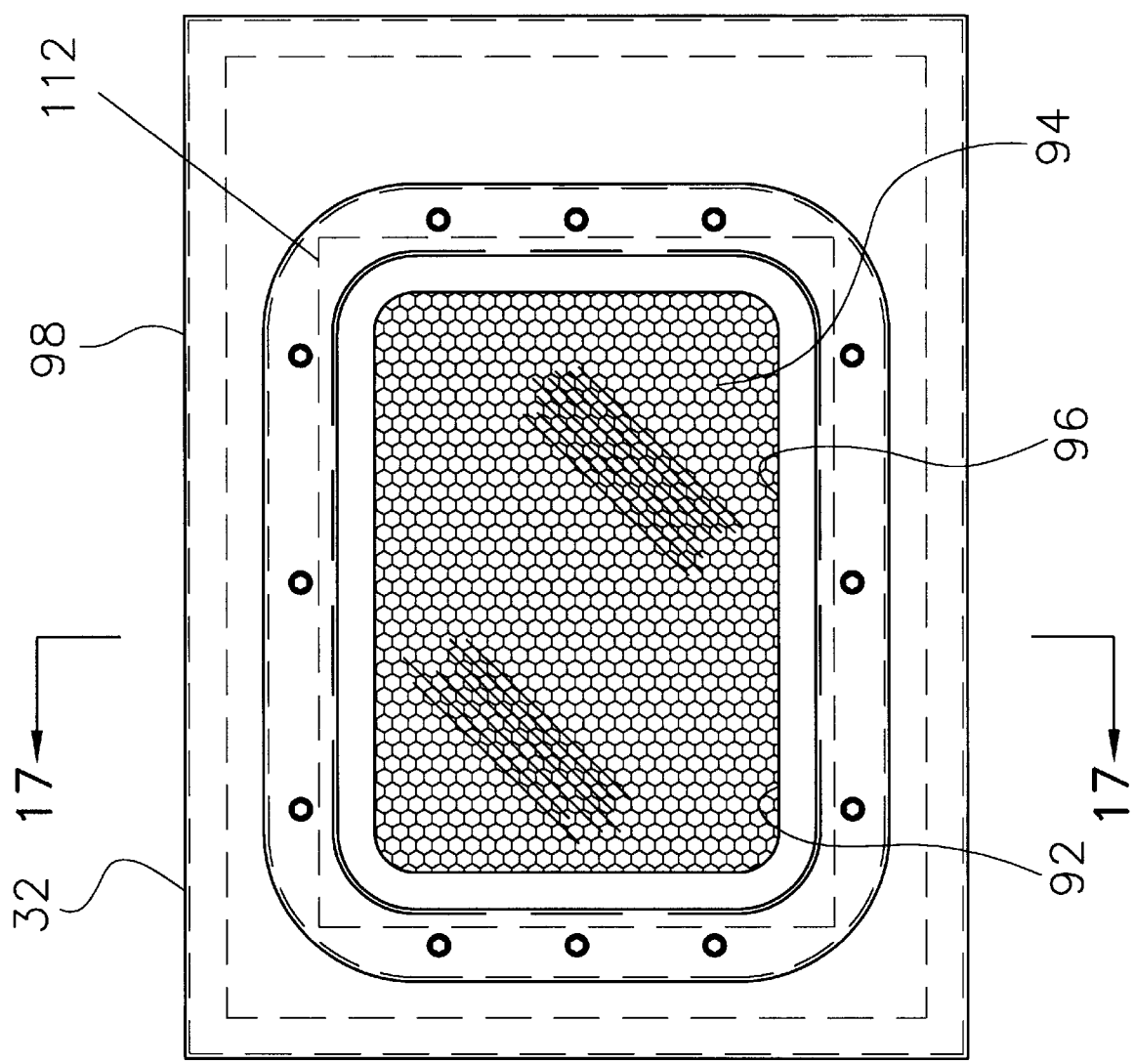

$f_C$ = 5 GHz
BW= 5 %

$f_C$ = 5 GHz
BW= 10 %

$f_C$ = 5 GHz
BW= 20 %

$f_C$ = 5 GHz
BW= 40 %

$f_c$ = 15 GHz
BW = 1.3 %

$f_c$ = 15 GHz
BW = 2.5 %

$f_c = 15$ GHz
BW = 5 %

$f_c = 15$ GHz
BW = 10 %

$f_c$ = 15 GHz
BW= 20 %

$f_c$ = 15 GHz
BW= 40 %

VARIABLE FREQUENCY MICROWAVE HEATING APPARATUS

This application is a continuation-in-part of and claims subject matter disclosed in earlier filed application Ser. No. 08/306,305 filed on Sep. 14, 1994, now U.S. Pat. No. 5,521,360, which is a continuation-in-part of and claims subject matter disclosed in earlier filed application Ser. No. 08/221,188 filed on Mar. 31, 1994, now abandoned, which was a continuation-in-part of and claims subject matter disclosed in earlier filed application Ser. No. 07/792,103 filed on Nov. 14, 1991, which issued as U.S. Pat. No. 5,321,222 on Jun. 14, 1994, each of which disclosed subject matter invented by at least one inventor of the present invention.

This invention was made with Government support under Contract No. DE-AC05-84OR21400 awarded by the U.S. Department of Energy to Martin Marietta Energy Systems, Inc. and the Government has certain rights in this invention.

TECHNICAL FIELD

This invention relates to the field of microwave radiation. More specifically, this invention relates to a microwave furnace having the capability of selectively varying the frequency and power of the microwave source.

BACKGROUND ART

In the field of microwave radiation, it is well known that microwave furnaces are typically constructed with a fixed operating frequency. It has long been known that the interactions of various materials with microwaves are frequency dependent. These interactions may include curing rubber and sintering ceramics. It is therefore desirable to have a microwave furnace that can be operated over a broad frequency range.

Most microwave sources have a very narrow bandwidth because they employ a resonant cavity. Microwave ovens constructed for home use are provided with a magnetron which operates at 2.45 GigaHertz (GHz), which is an efficient frequency for heating water. Due to the coupling ability of a 2.45 GHz microwave to water, these ovens are used for cooking foods, drying, and other purposes wherein the principal material to be acted upon is water. However, it is well known that frequencies in this range are not optimal in all situations, such as with heating plasmas, sintering materials such as ceramics, and preparing films such as diamond films.

The use of frequency sweeping over a wide range as a means of mode stirring has important implications for the use of microwave power to sterilize medical equipment or contaminated wastes. In such uses it is crucial to eliminate "dead" areas in the cavity wherein sufficient power may not be received in order for complete sterilization. Electronic frequency sweeping may be performed at a high rate of speed, thereby creating a much more uniform time-averaged power density throughout the furnace cavity. The desired frequency sweeping may be accomplished through the use of a variety of microwave electron devices. A helix traveling wave tube (TWT), for example, allows the sweeping to cover a broad bandwidth (e.g., 2 to 8 GHz) compared to devices such as the voltage tunable magnetron (2.45+−0.05 GHz). Other devices have other characteristic bandwidths as will be disclosed hereinafter.

Further, fixed-frequency microwave ovens typically found in the home are known to have cold spots and hot spots. Such phenomena are attributed to the ratio of the wavelength to the size of the microwave cavity. With a relatively low frequency microwave introduced into a small cavity, standing waves occur and thus the microwave power does not uniformly fill all of the space within the cavity, and the unaffected regions are not heated. In the extreme case, the oven cavity is becomes practically a "single-mode" cavity.

Attempts have been made at mode stirring, or randomly deflecting the microwave "beam", in order to break up the standing modes and thereby fill the cavity with the microwave radiation. One such attempt is the addition of rotating fan blades at the beam entrance of the cavity.

Another method used to overcome the adverse effects of standing waves is to intentionally create a standing wave within a single-mode cavity such that the workpiece may be placed at the location determined to have the highest power (the hot spot). Thus, only the portion of the cavity in which the standing wave is most concentrated will be used.

It has been shown that the sintering behavior of various materials improves at higher frequencies, although the exact reasons are not known. However, existing state-of-the-art technology has made difficult the task of conducting a series of identical sintering experiments in which only the frequency is changed. This is due in large part to the fact that each microwave source is connected to a different furnace cavity. It is well known that the geometry of the furnace cavity is a parameter which must be considered in such experiments.

Furnaces incorporating gyrotron oscillators to produce fixed-frequency microwaves at 28 GHz have been reported in the literature. The gyrotron furnaces are capable of sintering some materials more efficiently than those ovens provided with the 2.45 GHz magnetrons. The gyrotron furnaces have specific applications in sintering materials such as ceramics. However, 28 GHz is not an efficient frequency with which to sinter all materials. It is desired to determine the most efficient frequencies to apply to a given material in a furnace with a cavity having a selected configuration.

The frequency for most efficient processing may vary for a given material as the heating process occurs. As a material changes phases, a varied frequency may be required. Thus, it may be desired to have the capability of varying the frequency in the heating process, allowing the tester to begin heating the specimen at one frequency and then change the frequency to maintain good coupling as the temperature rises. This may also be desirable when heating composite materials, where the varying materials efficiently react at different frequencies.

Other devices have been produced to change the parameters of the heating process of selected materials. Typical of the art are those devices disclosed in the following U.S. Patents:

| U.S. Pat. No. | Inventor(s) | Issue Date |
| --- | --- | --- |
| 3,611,135 | D. L. Margerum | Oct 5, 1971 |
| 4,144,468 | G. Mourier | Mar 13, 1979 |
| 4,196,332 | A. MacKay B, et al. | Apr 1, 1980 |
| 4,340,796 | M. Yamaguchi, et al. | Jul 20, 1982 |
| 4,415,789 | T. Nobue, et al. | Nov 15, 1983 |
| 4,504,718 | H. Okatsuka, et al. | Mar 12, 1985 |
| 4,593,167 | O. K. Nilssen | Jun 3, 1986 |
| 4,777,336 | J. Asmussen | Oct 11, 1988 |
| 4,825,028 | P. H. Sinith | Apr 25, 1989 |

-continued

| U.S. Pat. No. | Inventor(s) | Issue Date |
| --- | --- | --- |
| 4,843,202 | P. H. Smith, et al. | Jun 27, 1989 |
| 4,866,344 | R. I. Ross, et al. | Sep 12, 1989 |
| 4,939,331 | B. Berggren, et al. | Jul 3, 1990 |

The subject matter disclosed by MacKay ('332) is further discussed in an article authored by MacKay B, et al., entitled "Frequency Agile Sources for Microwave Ovens", *Journal of Microwave Power*, 14(1), 1979. However, a microwave furnace having a wide frequency range has not been disclosed, except in the above-referenced co-pending application Ser. No. 07/792,103.

One barrier to the use of a wide frequency range is the difficulty of achieving efficient coupling of the microwaves to a multi-mode applicator cavity, particularly when such coupling means includes a dielectric window.

Therefore, it is an object of this invention to provide a microwave heating apparatus that can be operated over a wide frequency range.

Another object of the present invention is to provide a microwave heating apparatus which may be operated over a wide frequency range wherein the microwave source may be interchanged with microwave sources having other frequency ranges.

Still another object of the present invention is to provide a microwave heating apparatus whereby two or more microwave sources may be placed into the system in parallel.

A further object of the present invention is to provide a microwave heating apparatus including a plurality of microwave sources placed in parallel, wherein the microwave sources may be selectively and alternately used.

Still another object of the present invention is to provide such a microwave heating apparatus with multiple microwave sources whereby each microwave source is controlled by a common signal generator and power supply.

Yet another object of the present invention is to provide a microwave heating apparatus whereby frequency modulation may be used as a form of mode stirring to create a more uniform power distribution in a multi-mode cavity and the loads placed therein.

DISCLOSURE OF THE INVENTION

Other objects and advantages will be accomplished by the present invention which is designed to allow modulation of the frequency of the microwaves introduced into a furnace cavity for testing or other selected applications. Some applicable processes include heat treatment, sterilization, sintering, plasma processing, ore processing, polymerization, etching, and preparing films.

A microwave signal generator is provided for generating a low-power microwave signal for input to the microwave amplifier. The signal generator of the preferred embodiment is able to sweep a given range of frequencies, operate in pulse mode, modulate the frequency of the microwave signal, and produce various complex waveforms. The microwave signal generator of the preferred embodiment may be operated in the pulse mode using an internal pulse generator or it can be pulsed externally. An internal modulator is provided for wide band modulation. The internal modulator may operate in the AM mode or in the FM mode.

A voltage controller serves to modulate the amplitude of the microwave voltage-controlled oscillator. The microwave voltage-controlled oscillator may be used in lieu of the microwave signal generator to modify the frequency and amplitude of the generated microwave.

A first amplifier may be provided to amplify the magnitude of the signal output from the microwave signal generator or the microwave voltage-controlled oscillator. The first amplifier of the preferred embodiment is voltage-controlled, therefore the gain is adjustable such that the magnitude of the output is selectable by the operator.

A second amplifier is provided for processing the signal output by the first amplifier, or from the microwave signal generator or the microwave voltage-controlled oscillator when a first amplifier is not employed. The second amplifier outputs a high-power microwave signal to the furnace cavity and to which the workpiece is subjected. In the preferred embodiments, the second amplifier may be any one of a helix traveling-wave tube (TWT), a coupled-cavity TWT, a ring-loop TWT, a ring-bar TWT, a klystron, a twystron, or a gyrotron. These devices include an internal cooling device designed to dissipate the heat collected by the amplifier during normal operation.

In another embodiment of the invention, the oscillator and first and second amplifiers may be replaced with a frequency-agile coaxial magnetron, the frequency of which can be tuned manually, mechanically, or electrically.

A power supply is provided for the operation of the second amplifier. In the preferred embodiments, the power supply is a direct current source consisting of a precision-regulated cathode power supply and a less-regulated collector high voltage supply.

A directional coupler is provided for detecting the direction of a signal and further directing the signal depending on the detected direction. A signal received from the microwave source is directed toward the microwave cavity. A signal received from the direction of the microwave cavity is directed toward a reflected power load. The directional coupler thus provides a means whereby reflected power is diverted away from the microwave source in order to protect the microwave source from power unabsorbed by the workpiece. The directional coupler of the preferred embodiment is water-cooled for the dissipation of heat collected through the transmission of power from the microwave source and the reflection of power from the microwave cavity.

A first power meter is provided for measuring the power delivered to the microwave cavity. The first power meter is used in conjunction with a second power meter positioned to measure reflected power from the microwave cavity in order to monitor the efficiency of the microwave cavity and to insure that reflected power is dissipated in the reflected power load and not by the second amplifier.

The reflected power load may also be used to test the functionality of the system by removing all workpieces from the microwave cavity, thus directing the entire signal from the second amplifier into the reflected power load. Comparisons can be made of the power received by the reflected power load and the power delivered from the second amplifier to determine any system losses.

The magnitude of the reflected power is detected by the second power meter. This magnitude may be used to determine the efficiency of the instant frequency of the microwave introduced into the microwave cavity. A lower reflected power will indicate a more efficient operating frequency due to the higher absorption rate of the selected workpiece.

A tapered transition may be provided to enhance the efficiency with which the broadband microwave energy is coupled into the microwave cavity. By acting as an impedance transformer between the transmission line and the microwave cavity, this transition increases the percentage power coupled into the cavity. In addition, for applications in which the microwave energy must be coupled into a cavity in which reactive gases are present, this tapered transition provides a means of reducing the power density of the microwave energy at the interface between the window and reactive gases, thereby preventing formation of plasma discharges at the input window.

BRIEF DESCRIPTION OF THE DRAWINGS

The above mentioned features of the invention will become more clearly understood from the following detailed description of the invention read together with the drawings in which:

FIG. 16 illustrates a front elevational view of a viewport for viewing activity within the microwave cavity used in accordance with the present invention;

BEST MODE FOR CARRYING OUT THE INVENTION

A variable frequency microwave heating apparatus incorporating various features of the present invention is illustrated generally at 10 in the figures. The microwave heating apparatus 10 is designed to allow modulation of the frequency of the microwaves introduced into a microwave cavity for testing or other selected applications. Such modulation is useful in testing procedures to determine the most efficient frequencies at which a particular material may be processed. Frequency modulation is also useful as a method of mode stirring as a means to create a more uniform power distribution in a relatively small microwave cavity.

Frequency modulation testing is useful, not only in the determination of efficient sintering frequencies of a selected material, but also in determining the most efficient sintering frequencies for the individual phases of a selected material. In the same vein, frequency modulation is useful in the processing of a material undergoing phase changes, wherein each phase of the material couples more efficiently to a frequency varied from that of other phases. Further, frequency modulation is useful when processing composite materials wherein each component couples to a different frequency than other components.

Figure 1:
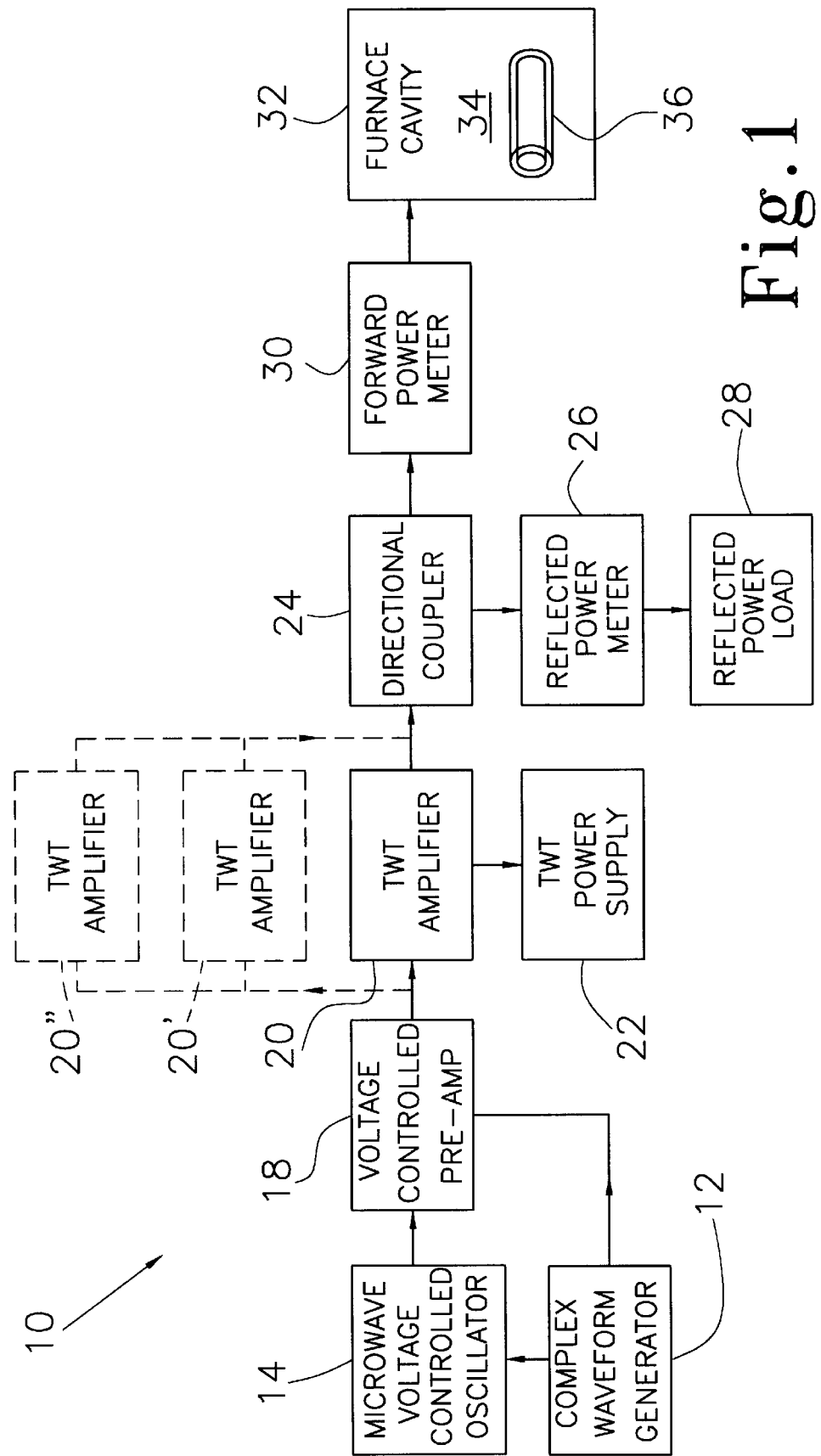
FIG. 1 is a schematic diagram of the preferred embodiment of the variable frequency microwave heating apparatus of the present invention.

FIG. 1 illustrates schematically the preferred embodiment of the variable frequency microwave heating apparatus 10 of the present invention, wherein a selected workpiece 36 is to be processed. Applicable processes include, but are not limited to, heat treatment, sterilization, sintering, plasma processing, ore processing, polymerization, etching, and preparing films. It will be understood that the term "workpiece" as used within the present disclosure refers to a selected material or composition of materials. The term "workpiece" may further include such selected material or composition of materials wherein at least one of the materials is undergoing at least one phase change and is, therefore, in more than one phase at a given time.

A microwave voltage-controlled oscillator 14 is provided for generating a low-power microwave signal for input to the microwave furnace 32. A complex waveform generator 12 provides the controlling voltage to the voltage-controlled oscillator 14, causing the voltage-controlled oscillator to sweep a given range of frequencies, operate in pulse mode, modulate the frequency of the microwave signal, and produce various complex waveforms.

The complex waveform generator 12 of the preferred embodiment may be operated in the pulse mode using an internal pulse generator or it can be pulsed externally. An internal modulator is provided for wide band modulation. The internal modulator may operate in the AM mode or in the FM mode.

The microwave voltage controlled oscillator 14 generates a microwave signal of a frequency determined by the voltage applied to the voltage controlled oscillator 14 by the waveform generator 12. It may be desirable to modulate the frequency of the microwave as a selected material may efficiently couple with a particular frequency and require a high voltage level, whereas a second material may couple more efficiently at a different frequency and at a lower, or higher, voltage level. Thus, the microwave voltage-controlled oscillator 14 may be used in combination with the complex waveform generator 12 to modify the frequency of the generated microwave.

It will be seen that the number of possible combinations of frequencies and power levels is numerous. Further, with the ability of such frequency and amplitude modulation, it will be seen that the processing of a workpiece 36 may be accomplished by alternating the frequency and amplitude of the microwave in order to achieve maximum processing efficiency. The modulations may occur at such rates as to be undetectable by the workpiece 36, yet creating maximum processing efficiency for each material and material phase.

A first amplifier 18 may be provided to amplify the power of the signal output from the microwave voltage-controlled oscillator 14. The first amplifier 18 of the preferred embodiment is voltage-controlled, therefore the gain is adjustable such that the magnitude of the output is selectable by the operator. During operation of the variable frequency microwave heating apparatus 10, the operator may instantaneously adjust the first amplifier 18 such that the amplitude of the microwave may be correspondingly adjusted. The control voltage for the first amplifier 18 can also be supplied by the complex waveform generator 12, allowing the amplitude of the signal output to be modulated in any desired way.

A second amplifier 20 is provided for processing the signal output by the first amplifier 18, or from the microwave voltage-controlled oscillator 14 when a first amplifier 18 is not employed. The second amplifier 20 outputs the microwave signal input to the multi-mode furnace cavity 34 and to which the workpiece 36 is subjected. In the preferred embodiments, the second amplifier 20 may be any one of a helix traveling-wave tube (TWT), a coupled-cavity TWT, a ring-loop TWT, a ring-bar TWT, a klystron, a twystron, or a gyrotron.

The TWT 20 is a linear beam device wherein a signal having a selected frequency and wave form is amplified and output. The TWT 20 has the capability of amplifying any selected frequency or waveform within a range or bandwidth defined by the configuration of the TWT 20. Particularly, the physical geometry of the TWT 20 limits the frequency range, such that as a high limit is reached, a counteracting signal is encountered, giving the appearance of a second wave.

In order to achieve a frequency higher or lower than that capable of the TWT 20 incorporated in a particular configuration, the internal geometry of the TWT 20, especially the pitch of the helix 40, is changed. In the latter mentioned TWT 20, a new frequency range will be defined. It will be seen, therefore, that a variety of configurations of TWT's 20 is possible such that a broader range of frequencies may be achieved. To this end, the TWT's 20 of the present invention are designed to be selectively removable from the variable frequency microwave heating apparatus 10 and interchangeable with other such TWT's 20. Hence, a single microwave voltage-controlled oscillator 14, microwave furnace 32, and microwave furnace cavity 34 may be used with a variety of TWT's 20, thus allowing a series of identical tests to be performed with the microwave frequency being substantially the only variable. One TWT 20 may define a frequency range of 4 GHz to 8 GHz, while another TWT 20' defines a frequency range of 8 GHz to 16 GHz. Still another TWT 20" may define a third frequency range. Interchanging TWT 20 with TWT 20' defines a total range from 4 GHz to 16 GHz. One such TWT 20 defining a range of 4 GHz to 8 GHz is the Model T-1096 G/H Band Helix TWT manufactured by Microwave Laboratories, Inc. Specifications for the Model T-1096 are listed in Table 1.

Figure 3:
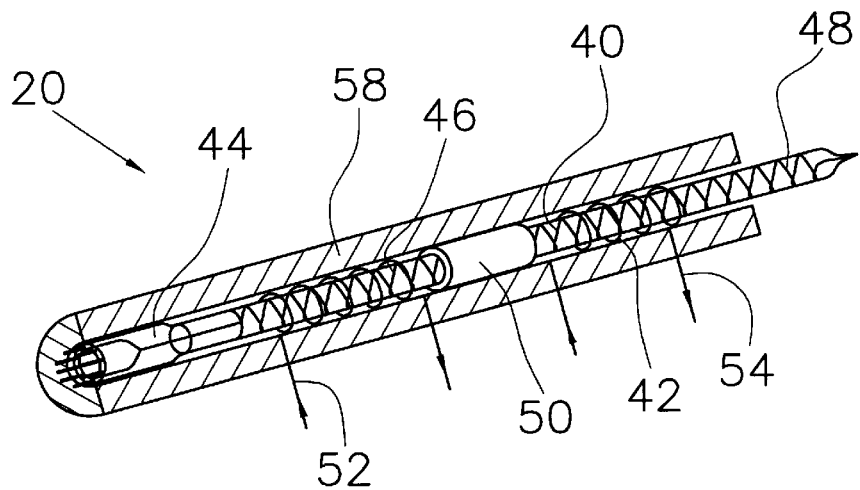
FIG. 3 is a perspective view of the traveling wave tube, shown partially in section, which is incorporated in the variable frequency microwave heating apparatus of the present invention.
Figure 4:
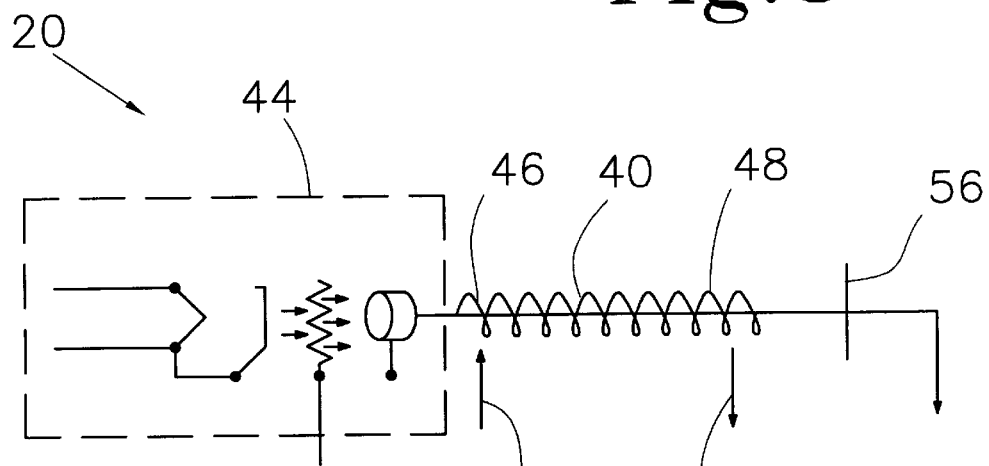
FIG. 4 is a schematic diagram of a traveling wave tube which is incorporated in the variable frequency microwave heating apparatus of the present invention.
Figure 5:
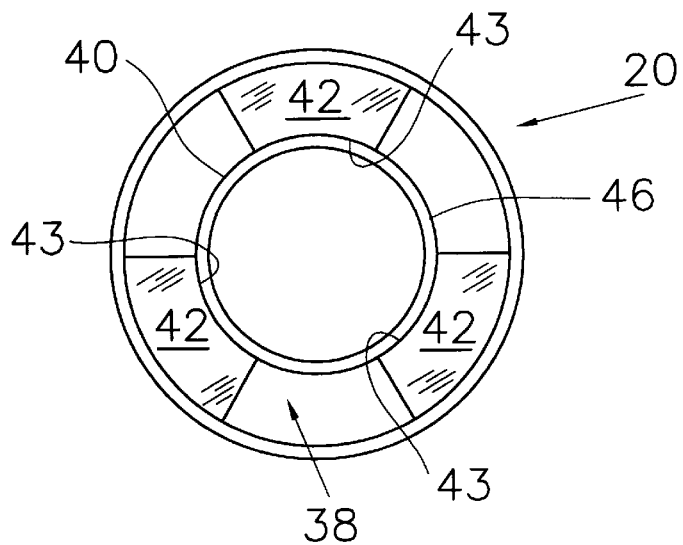
FIG. 5 is an end view of the traveling wave tube, shown in cross-section, which is incorporated in the variable frequency microwave heating apparatus of the present invention.

As earlier mentioned, the traveling wave tube 20 is a linear beam device characterized by a traveling electric field which continuously extracts energy longitudinally along the path of an electron beam. As shown graphically in FIG. 3 and diagrammatically in FIG. 4, a typical TWT 20 is constructed with an electron gun assembly 44 attached to the first end 46 of a single-wire helix 40. The gun assembly 44 produces a focused beam of electrons which is directed through the center of the helix 40. Tapered carbon attenuators 50, integral to the helix 40, serve as directional couplers preventing reflections from passing back to the tube input. Rf input and output windings 52,54 are placed at the cathode and collector ends 46,48, respectively, of the helix 40.

TABLE 1

Specifications for the T-1096 G/H Band Helix TWT

|  | Min | Max | Typ | Unit |
| --- | --- | --- | --- | --- |
| RF Performance |  |  |  |  |
| Power Output | 63.0 | 65.0 | 63.5 | dbm |
| Frequency Range | 4.0 | 8.0 |  | Ghz |
| Harmonic Content | — | −3.0 | −6.0 | dbc |
| Gain at rated Power | 25.0 | 37.0 | 30.0 | db |
| Electrical Parameters |  |  |  |  |
| Helix Voltage | −8.0 | −9.0 | −8.4 | kV |
| Anode Voltage (WRTC) | 0.0 | +9.0 | — | kV |
| Collector Voltage (WRTC) | +6.2 | +6.8 | +6.5 | kV |
| Filament Voltage (WRTC) | 12.4 | 13.2 | 12.8 | V |
| Solenoid Voltage | 35.0 | 57.0 | 48.0 | V |
| Vac-Ion Voltage | +3.5 | +5.0 | +3.5 | kV |
| Helix Current | — | 25.0 | 15.0 | mA |
| Anode Current | — | 5.0 | — | mA |
| Collector Current | 0.9 | 1.8 | 1.2 | A |
| Filament Current | 1.2 | 2.0 | 1.4 | A |
| Solenoid Current | 21.0 | 26.0 | 25.0 | A |

A collector 56, charged positively, is located at the second end 48 of the helix 40. The collector 56 provides the source of energy for the operation of the TWT 20. Beam focusing and containment magnets 58 surround the entire assembly of the TWT 20.

Electrons traversing the axis of the helix 40 interact with the rf wave propagating along the helix 40 such that energy is transferred from the electron beam to the rf wave. This interaction is continuous and cumulative, increasing the amplitude of the rf signal as it propagates along the helix 40.

The second amplifier 20 of the preferred embodiment includes an internal cooling device 38 designed to dissipate the heat collected by the second amplifier 20 during normal operation. Particularly, in the event of a helix TWT, the helix of the TWT 20 and the helix supports 42 are fabricated from selected materials in order to perform this function. The helix TWT 20 of the preferred embodiment is provided with a helix 40 fabricated from flat copper wire. A plurality of retainers 42 are positioned in parallel fashion about the longitudinal axis of the helix TWT 20 about which the copper wire is wrapped, the retainers 42 serving to retain the helix 40 defined by the copper wire and further to dissipate the heat transferred to the copper wire during operation of the helix TWT 20. In the preferred embodiment the retainers 42 define a cross-section with at least one substantially flat side 43, the flat side 43 being in substantial contact with the copper wire.

Further, the retainers 42 of the preferred embodiment are fabricated from beryllium oxide. It is known that even though beryllium oxide is an electrical insulator, it is also an excellent conductor of heat. The copper wire defining a flat cross-section and substantially contacting the flat side 43 of the retainers 42 provides for an efficient and thorough dissipation of the heat transferred to the copper wire, thus providing a cooling means 38 for the internal portion of the helix TWT 20 and hence extending the life of the helix TWT 20.

A power supply 22 is provided for the operation of the second amplifier 20. Though not individually depicted in the figures, the preferred power supply 22 is a direct current source consisting of a precision-regulated cathode power supply and a less-regulated collector high voltage supply. Output regulation for the cathode supply is accomplished through a tube regulator circuit using a tetrode tube. One such tube is the Eimac 4PR400A tube. Regulation for the collector supply and the cathode raw supply is accomplished with an electromechanical regulator. The collector supply of the preferred embodiment is provided with two switch plates for the selection of output ranges. A typical power supply 22 used to power the second amplifier 20 is the Universal Voltronics Model BRE-15-140-ML High Voltage Power Supply. The specifications of the Universal Voltronics power supply are listed in Table 2.

TABLE 2

Electrical Specifications for the Universal
Voltronics Model BRE-15-140-ML Power Supply

HELIX SUPPLY

| | |
|---|---|
| Output Voltage | 500 V - 15 KVDC |
| Output Current | 140 mADC |
| Polarity | Negative Output |
| Ripple | .01% rms @ 15 KVDC, 140mADC |
| Regulation, load | +0.1% from no load to full load @ maximum output |
| Regulation, line | +0.1% for line voltage from 190–230 VAC @ maximum output |

COLLECTOR SUPPLY

Output Voltage and Current

| | |
|---|---|
| Mode I (parallel) | 0–5 KV @ 4000 mA |
| Mode II (series) | 0–10 KV @ 2000 mA |
| Polarity | Positive output, negative tied to helix supply |
| Ripple | 3% rms @ 10 KVDC, 2000 mA |
| Regulation, load | +2% from no load to full load @ maximum output |
| Regulation, line | +2% for line voltage from 190–230 VAC @ maximum output |

TABLE 2-continued

Electrical Specifications for the Universal
Voltronics Model BRE-15-140-ML Power Supply CROWBAR (connected across the collector supply)

| | |
|---|---|
| Response Time | 5 microseconds |

SYSTEM

| | |
|---|---|
| Input Voltage | 190–230 VAC phase to phase, 3 phase, 60 Hz, 30 KVA |
| Power Connection | 5 position terminal board (3 phase neutral ground) |

Figure 2:
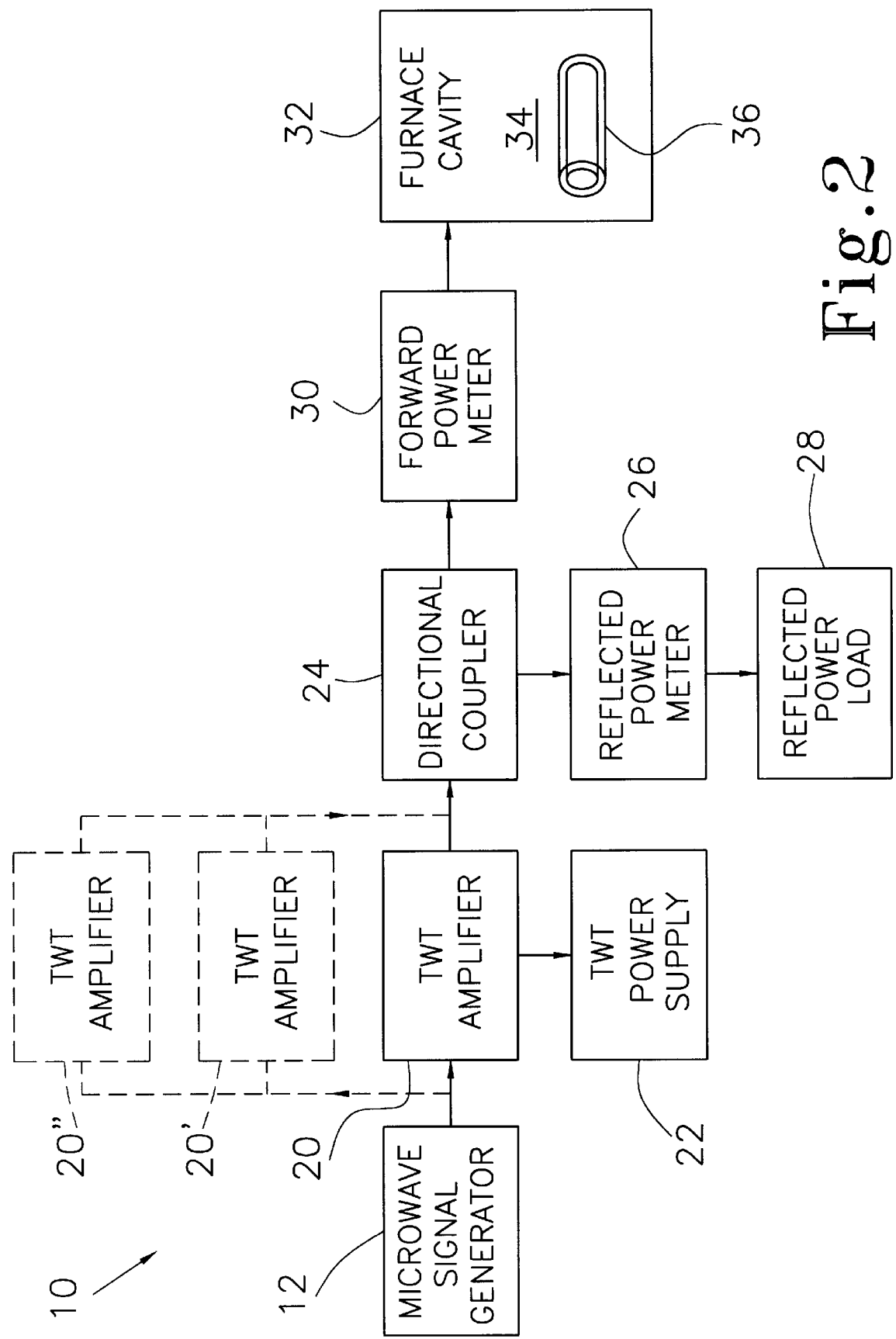
FIG. 2 illustrates a schematic diagram of another preferred embodiment of the variable frequency microwave heating apparatus of the present invention.

As shown in FIG. 2, the variable frequency microwave heating apparatus 10 may be operated without the use of a microwave voltage-controlled oscillator means 14 and a first amplifier 18. In this embodiment, the microwave signal generator 12 is employed independently to generate a selected signal and is output directly without further modification. One such microwave signal generator 12 is the Model 6724 signal generator manufactured by Wiltron. In this embodiment, the amplitude modulation is performed within the power supply 22 of the second amplifier 20.

Referring to FIGS. 1 and 2, a directional coupler 24 is provided for detecting the direction of a signal and further directing the signal depending on the detected direction. The directional coupler 24 is provided proximate the collector end of the second amplifier 20. A signal received from the second amplifier 20 is directed toward the microwave cavity 32. A signal received from the direction of the microwave cavity 32 is directed toward a reflected power load 28. The directional coupler 24 thus provides a means whereby a reflected signal—that is, power not absorbed by the workpiece 36 and therefore directed back toward the source 20—is diverted away from the second amplifier 20 in order to protect the second amplifier 20 from power unabsorbed by the workpiece 36. The reflected power load 28 of the preferred embodiment is water-cooled for the dissipation of heat collected through the reflection of power from the microwave cavity 32.

A first power meter 30 is provided for measuring the power delivered to the microwave cavity 32. The first power meter 30 is used in conjunction with a second power meter 26 positioned to measure reflected power from the microwave cavity 32 in order to monitor the efficiency of the microwave cavity 32 and to insure that reflected power is dissipated in the reflected power load 28 and not by the second amplifier 20.

The signal output by the second amplifier 20 is introduced into the microwave cavity 34 for absorption by the selected workpiece 36. Typically, the introduced signal is not completely absorbed by the workpiece 36 and is therefore reflected back toward the second amplifier 20, having no other path to follow.

The reflected signal reaches the directional coupler 24 and is there diverted toward the second power meter 26 and finally to the reflected power load 28. The reflected power is dissipated in the reflected power load 28, as previously mentioned, in an attempt to protect the longevity of the second amplifier 20. The reflected power load 28 may also be used to test the functionality of the system by removing all workpieces 36 from the microwave cavity 34, thus directing the entire load from the second amplifier 20 into the reflected power load 28. Comparisons can be made of the power received by the reflected power load 28 and the power delivered from the second amplifier 20 to determine any system losses.

The magnitude of the reflected power is detected by the second power meter 26. This magnitude may be used to determine the efficiency of the instant frequency of the microwave introduced into the microwave cavity 34. A lower reflected power will indicate a more efficient operating frequency due to the higher absorption rate of the selected workpiece 36.

From the foregoing description, it will be recognized by those skilled in the art that a variable frequency microwave heating apparatus 10 offering advantages over the prior art has been provided. Specifically, the microwave heating apparatus 10 of the present invention provides a means for adjusting the frequency of the microwaves introduced into a cavity 34 for sintering purposes, or as otherwise required. It will be seen that the microwave heating apparatus 10 of the present invention is useful in testing the processing characteristics of selected materials with respect to microwave frequency. Such test will enable the design of a microwave furnace 32 with a microwave source 12 which generates microwaves at the determined frequency.

It will further be seen that the microwave heating apparatus 10 of the present invention is useful as a production tool in that the frequency of the microwaves may be varied for different materials or material phases. The frequency modulation may be performed during the operation of the microwave heating apparatus 10 in order to accommodate various materials and material phases. Further, the frequency modulation capability of the present invention serves as a method of mode stirring for creating a more uniform power distribution in relatively small microwave cavities 34.

The efficiency of the variable frequency microwave heating apparatus 10 of the present invention has been displayed in various tests performed in the development process. Described below are two embodiments tested. However, it is not the intentions of the inventors to limit the present invention to such embodiments.

In the first tested embodiment, a 2.5 KW microwave furnace 32 suitable for sintering, heat treatment, and other high-temperature processes was constructed. A voltage-controlled oscillator 14, Model VC0 100–0243 manufactured by Delphi Components, provided a low-power microwave signal, continuously variable from 4 to 8 GHz by the application of a 0 to 15 V control signal. A solid state preamplifier 18 with a variable gain option, Model NHI 4080MW-2 manufactured by National Hybrid, Inc., provided variable amplification of the signal from the voltage-controlled oscillator 14.

A high-power microwave amplifier 20 included a traveling wave tube, Model T-1096 manufactured by Microwave Laboratories, Inc. (see Table 1), and a high-voltage DC power supply, Model BRE-15-140-ML manufactured by Universal Voltronics (see Table 2). The high-power microwave amplifier amplified the signal for a gain of approximately +37 db. The resulting microwave power was continuously selectable over a frequency range of 4 to 8 GHz and a power range of 0 to 2.5 KW. The frequency and amplitude could be individually modulated into any waveform within these parameters.

A dual directional coupler 24, Model R202-5N manufactured by Microwave Engineering Corporation, was provided, through which the microwave power is applied. The microwave power was input to a multi-mode cavity 34 approximately 12 inches in diameter and approximately 9 inches long such that a wide variety of random microwave modes were excited within the cavity 34. Forward and reflected power levels were continuously measured with two power meters, Model HP436A manufactured by Hewlett Packard.

Efficient microwave heating was demonstrated for both silicon carbide and boron carbide ceramic bodies. In each case the frequency could be adjusted to minimize reflected power for the actual load in the cavity 34, and the ceramic heated rapidly. There was no need to adjust the dimensions of the cavity 34 or to excite any particular mode in order to heat with maximum efficiency.

In the second tested embodiment, a 300 W microwave furnace suitable at least for plasma processing, sterilization and food processing studies was constructed using the multi-mode cavity 34 from a conventional microwave oven and an air-cooled traveling wave tube with a bandwidth of 2 to 8 GHz.

Experiments with a wide variety of samples including water, popcorn, and alumina ceramics doped with Co, Cr, or V oxides demonstrated highly efficient heating when the microwave frequency was adjusted to minimize reflected power. Results showed that when the frequency was continuously swept across the operating bandwidth, reflected power was extremely low and the sample heated efficiently regardless of its location within the cavity 34.

One such test of the variable frequency microwave heating apparatus 10 included the curing of a sample of epoxy resin, namely, ERL-2258 resin manufactured by Union Carbide and M-phenylenediamine hardener manufactured by DuPont. Samples were mixed according to manufacturers' directions and poured into 4-inch diameter glass dishes. One sample was heated at a fixed frequency of 6 GHz whereas the other was heated in accordance with the present invention by sweeping the frequency from 4.5 to 7.5 GHz, 5000 times per second. The fixed-frequency sample suffered from non-uniform heating and ultimately catastrophic thermal runaway. The swept-frequency sample cured uniformly with no evidence of localized overheating, thereby demonstrating the value of frequency sweeping to create a more uniform power distribution within the microwave cavity 34.

Figure 6:
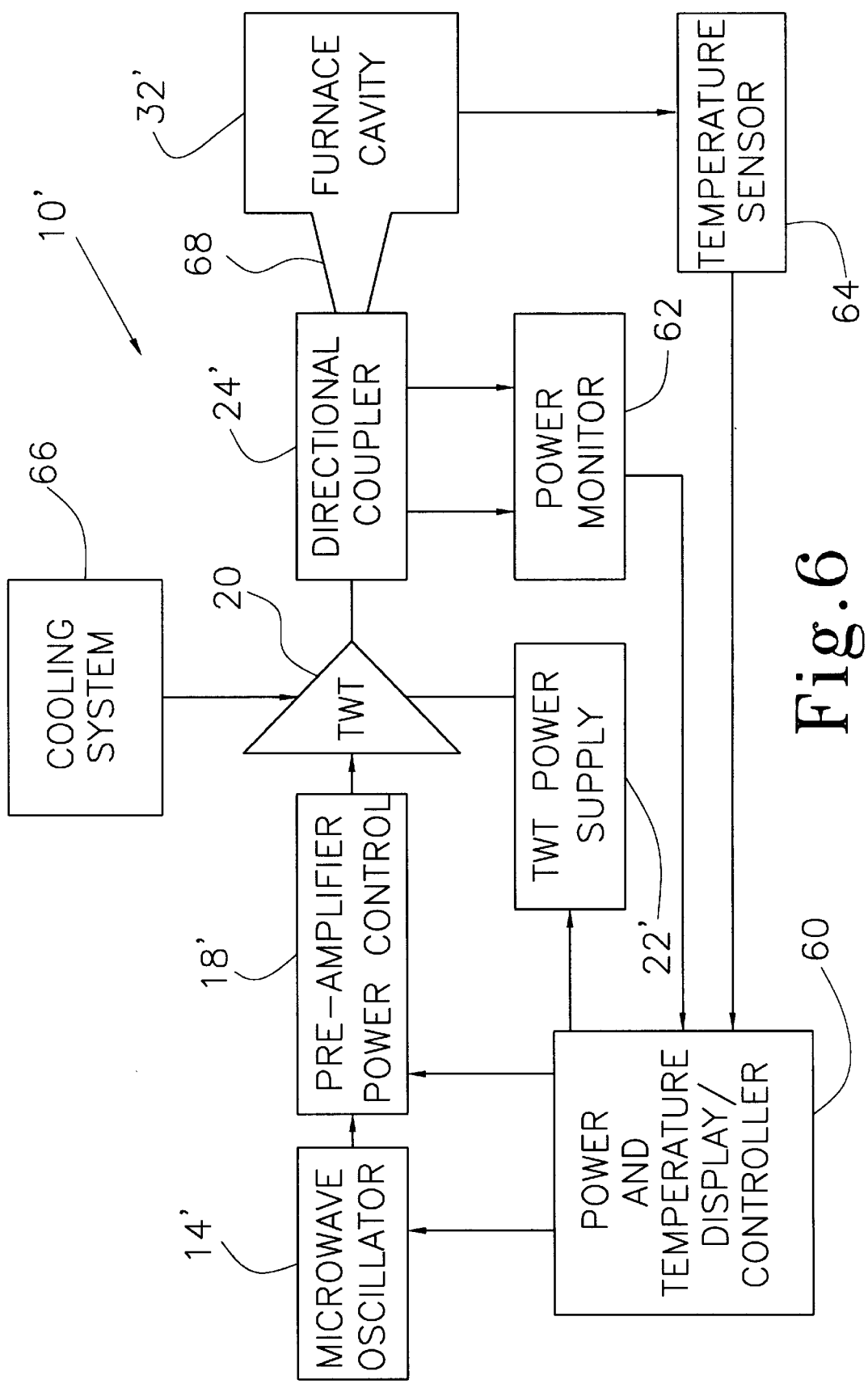
FIG. 6 illustrates a schematic diagram of another preferred embodiment of the variable frequency microwave heating apparatus of the present invention.

Illustrated in FIG. 6 is an alternate embodiment of the variable frequency microwave heating apparatus 10'. In this embodiment, a power and temperature display and controller 60 receives input from a power monitor 62 and a temperature sensor 64. The power monitor 62 receives input from the directional coupler 24' and serves the same basic functions as the reflected and forward power meters 26,30 incorporated in the previously described embodiment. The power and temperature display and controller 60 further serves to control the microwave oscillator 14', the preamplifier power control 18', and the TWT power supply 22'. A cooling system 66 is provided for cooling at least the TWT 20 during operation thereof.

A tapered waveguide coupler 68 may be provided to enhance the efficiency with which the broadband microwave energy is coupled into the microwave cavity. By acting as an impedance transformer between the transmission line from the directional coupler 24' and the microwave cavity 32', this transition increases the percentage power coupled into the microwave cavity 32'. In addition, for applications in which the microwave energy must be coupled into a microwave cavity 32' in which reactive gases are present, the tapered waveguide 68 provides a means of reducing the power density of the microwave energy at the interface between the microwave input window and reactive gases, thus preventing the formation of plasma discharges at the microwave input window.

Figure 7:
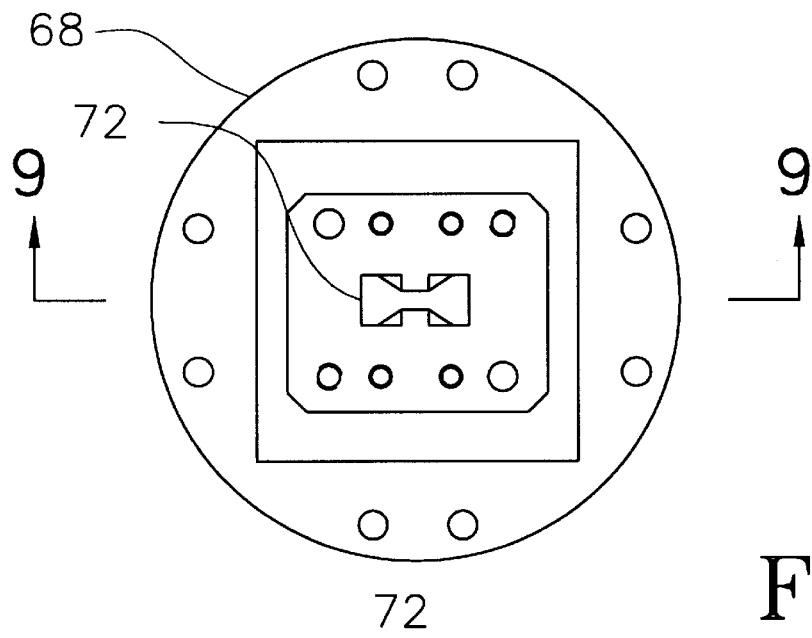
FIG. 7 is an elevational view of a tapered waveguide applicator of the present invention showing the inlet opening thereof.
Figure 9:
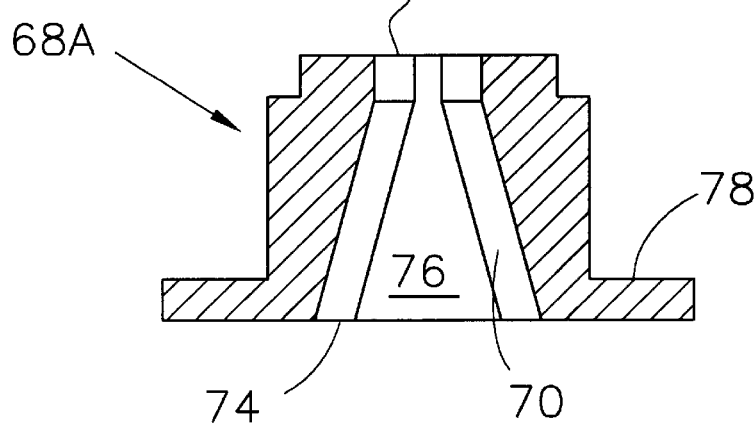
FIG. 9 is a bottom plan view, in section, of the tapered waveguide taken along 9—9 of FIG. 7.
Figure 8:
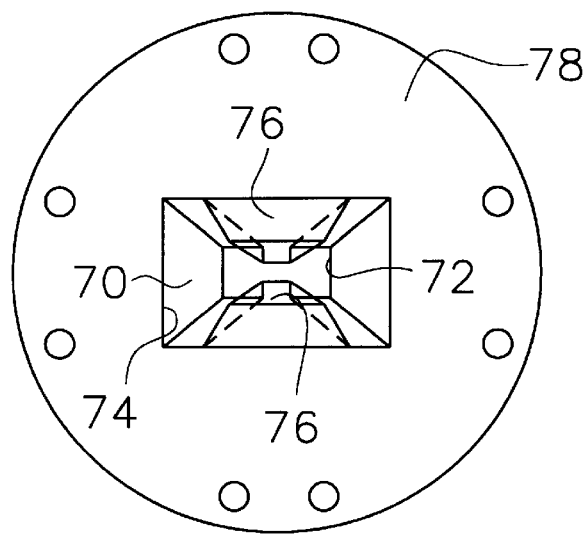
FIG. 8 is an end elevational view of the tapered waveguide applicator of FIG. 7 showing the outlet opening thereof.

Illustrated in FIGS. 7–9 is a tapered waveguide applicator 68A. FIG. 7 is an end view showing the inlet opening 72. FIG. 8 illustrates and end view showing an outlet 74. FIG.

9 illustrates a cross-sectional view of the waveguide applicator 68A, wherein the tapered inner wall 70 is more clearly detailed. It can be seen from these figures that one embodiment of the waveguide applicator 68A defines an inner wall 70 defining a smooth taper from the inlet 72 to the outlet 74, with the outlet 74 being a larger opening than the inlet 72. The inner wall 70 of the waveguide applicator 68A generally defines a rectangular opening at any given cross-section along the length thereof, with projections 76 extending from either side wall thereof. The projections 76 also define rectangular cross-sections. As illustrated in these figures, the projections define smooth tapers proportional to the taper of the inner wall 70 of the waveguide 68A. The body of the waveguide applicator 68A defines an end plate 78 for securement of the waveguide applicator 68A to the microwave heating apparatus 10.

In practice, it has been found that a free-space voltage standing wave ratio, or VSWR, of approximately 2:1 measured over the entire useful range of the microwave cavity 34 is achieved using the waveguide applicator 68A of FIGS. 7–9.

A variable frequency microwave heating apparatus 10 has been constructed for testing purposes using a 4–8 GHz Model T-1096 TWT source manufactured by Microwave Laboratories, Inc., and incorporating the tapered waveguide applicator 68A illustrated in FIGS. 7–9. A generally cylindrical multi-mode microwave cavity 34 was also used. Results of the testing are discussed by R. A. Rudder et al., "Diamond CVD Via Microwave-Excited Plasma from Water-Ethanol Solutions," Amer. Cer. Soc. Spring Meeting, Cincinnati, Ohio, 1993, which is incorporated herein by reference. In those tests, it was demonstrated that the microwave heating apparatus 10 including the waveguide applicator 68A of the present invention created high-intensity localized plasmas that could be moved and otherwise manipulated by adjusting the frequency. Dense plasmas were maintained with as little as 100 W of forward power. Reflected power was minimal at all frequencies across the 4–8 GHz bandwidth.

The microwave source 12 described above includes a helix TWT amplifier. However, it will be understood that many other microwave sources 12 may be used in accordance with other aspects of the present invention. Table 3 below gives typical characteristics of some other suitable microwave sources 12.

TABLE 3

Characteristics of Some Suitable Microwave Sources:

| Source Type | Frequency Range (GHz) | Bandwidth (%) | Peak Output Power (kW) | Average Output Power (kW) | Overall Eff. (%) |
| --- | --- | --- | --- | --- | --- |
| Ring-loop TWT | .5–20 | 5–15 | 1–20 | .05–.6 | 30–45 |
| Ring-bar TWT | .5–20 | 10–20 | 3–30 | .08–.9 | 30–45 |
| Coupled-cavity TWT | 5–300 | 5–15 | 50–5000 | 1–300 | 40–60 |
| Klystron | .5–70 | 5–8 | 100–8000 | 1–5000 | 40–70 |
| Crossed-field Amp | .5–20 | 15–40 | 100–3000 | 1–300 | 30–50 |

The helix TWT in the above embodiment is liquid cooled, and therefore requires additional power and support equipment. For bench-scale experimentation, air-cooled variable frequency microwave heating apparatuses 10 were built using Microwave Laboratories, Inc. air-cooled helix TWT's (e.g., model T-1067) and the tapered waveguide applicator 68A of the present invention. A 13×13×10 inch rectangular microwave cavity 34 was used, in which microwave power was coupled efficiently over the frequency range from 2.5 to 7.5 GHz. It will be recognized that this range covers almost two octaves. Tests using thermally sensitive paper demonstrated that frequency sweeping was highly effective at creating a uniform power density throughout the cavity 34.

The microwave cavity 34 of this embodiment was subjected to similar tests described above to cure a sample of epoxy resin [ERL-2258 resin from Union Carbide and M-phenylenediamine hardener from DuPont]. In these tests, both the frequency range and the sweep rate were reduced in order to determine the minimal range necessary for adequate mode stirring. At the same time, the sample size was increased to a 6 inch diameter disk. From these results, it was evident that even a 20% bandwidth would be sufficient to produce uniform microwave heating in some samples, and particularly those in which high thermal conductivity assists in bringing minor spatial variations into equilibrium.

As discussed previously, the microwave heating apparatus 10 of the present invention may be equipped with more than one microwave source 12. To this extent, the latter-described microwave heating apparatuses 10 were further modified by adding a second TWT (Microwave Laboratories, Inc. model T-1068) and a second tapered microwave applicator 68A, thereby giving the furnace 32 a useful bandwidth from approximately 2.5 to 17.5 GHz, or nearly three octaves. It will be understood that the foregoing example should not be interpreted as limiting the microwave heating apparatus 10 of the present invention to two microwave sources 12. Rather, it will be understood that any number of microwave sources 12 and waveguide applicators 68 can be combined with a single microwave cavity 34 in accordance with the present invention.

Figure 10:
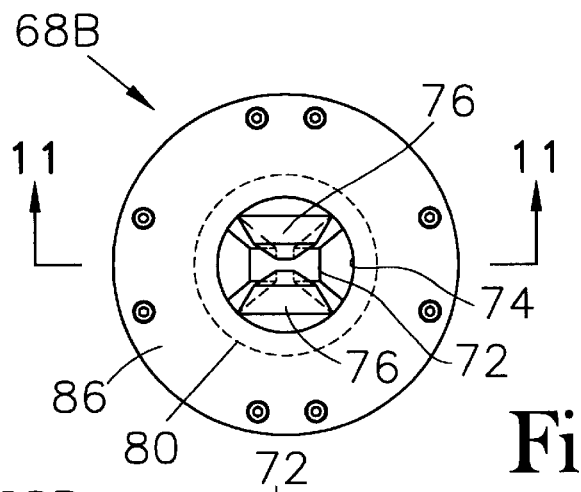
FIG. 10 is an end elevational view of an alternate embodiment of a tapered waveguide applicator further including a dielectric window and showing the outlet opening thereof.
Figure 11:
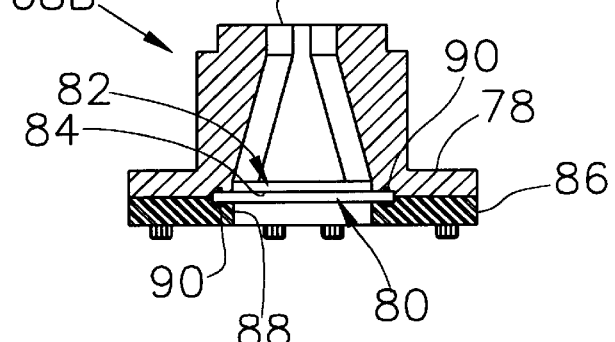
FIG. 11 is a bottom plan view, in section, of the tapered waveguide of FIG. 10 taken along 11—11 thereof.

FIGS. 10 and 11 illustrate an alternate embodiment of the waveguide applicator 68B wherein a window 80 is provided for use in environments wherein the pressures within the microwave cavity 34 are other than ambient and/or gases other than air are being used in the microwave heating process. The inlet 72 of this embodiment is similar to the of the previous embodiment, therefore, FIG. 7 is representative of the inlet 72 of the embodiment illustrated in FIGS. 10 and 11. The window 80 is dielectric in nature and can withstand positive and negative pressure differentials. The inner wall 70 of this embodiment of the waveguide applicator 68B terminates in a cylindrical, non-tapered end 82 at the outlet 74. The projections 76 terminate at the change of slope of the inner wall 70. A recess 84 is defined by the end plate 78 for receiving the dielectric window 80. A fastening plate 86 defining a centrally located opening 88 is secured to the end plate 78 and over at least the periphery of the dielectric window 80 to secure the position of the window 80 with respect to the waveguide 68B. Sealing members 90 are placed between the window 80 and the waveguide 68B and between the window 80 and the fastening plate 86 in order to prevent fluid communication from the microwave cavity 34 through the waveguide applicator 68B to the outside environment.

As in the embodiment depicted in FIGS. 7–9, a free-space VSWR of approximately 2:1 measured over the entire useful frequency range of the microwave cavity 34 is achieved using the waveguide applicator 38B of FIGS. 10–11.

It will be appreciated by those skilled in the art that many conventional techniques are available both for joining the tapered waveguide transition 68 to the furnace cavity 34 and for sealing the dielectric window 80 into the waveguide 68. It will be further appreciated that situations may arise in which it is necessary to cool the dielectric window 80 or waveguide 68 by an appropriate flow of air, liquid coolant, or the like.

It will also be appreciated by skilled artisans that the tapered ridges are used to provide optimal matching to a ridged, broadband waveguide—the WRD 350 type, for example—and are not needed if a non-ridged waveguide is used between the microwave source 12 and the tapered waveguide transition 68.

Figure 12:
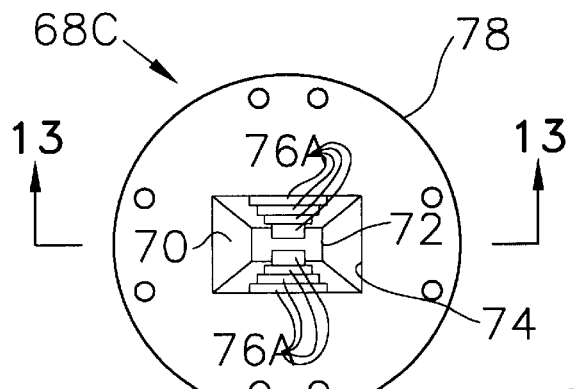
FIG. 12 is an end elevational view of an alternate embodiment of a tapered waveguide applicator showing the outlet opening thereof, and wherein the inner wall defines a step taper.
Figure 13:
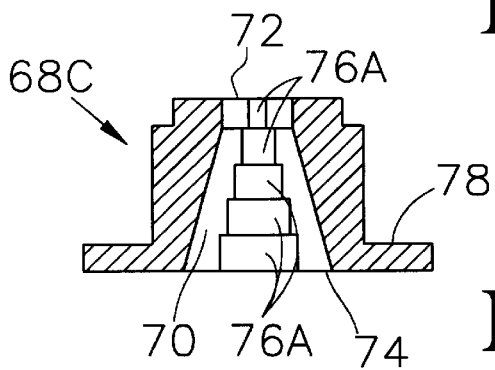
FIG. 13 is a bottom plan view, in section, of the tapered waveguide of FIG. 12 taken along 13—13 thereof.

FIGS. 12 and 13 illustrate another alternate embodiment of the waveguide applicator 68C of the present invention, with FIG. 7 again being representative of the inlet 72. As illustrated, the projections 76 in this embodiment define a "step" taper as opposed to the smooth taper in FIGS. 8 and 9. Thus, a series of rectangular projections 76A are defined, with the length of each successive projection increasing toward the outlet 74 and with the distance between opposing projections 76A increasing with each successive pair of opposing projections 76A. As opposed to the smooth taper in the previous embodiments, the projections 76A of the subject embodiment change dimensions at a finite number of discrete locations. The free-space VSWR retained in this embodiment is favorable.

Figure 15:
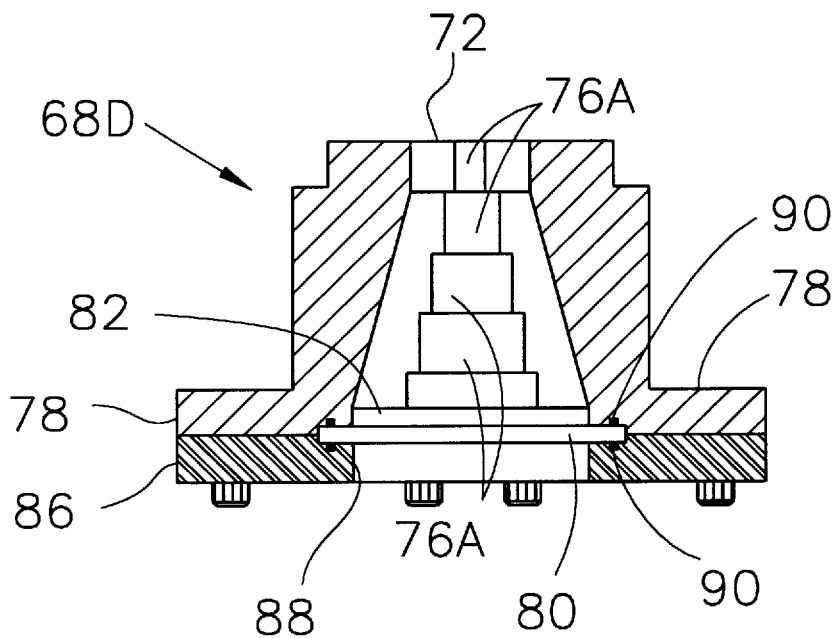
FIG. 15 is a bottom plan view, in section, of the tapered waveguide of FIG. 14 taken along 15—15 thereof.
Figure 14:
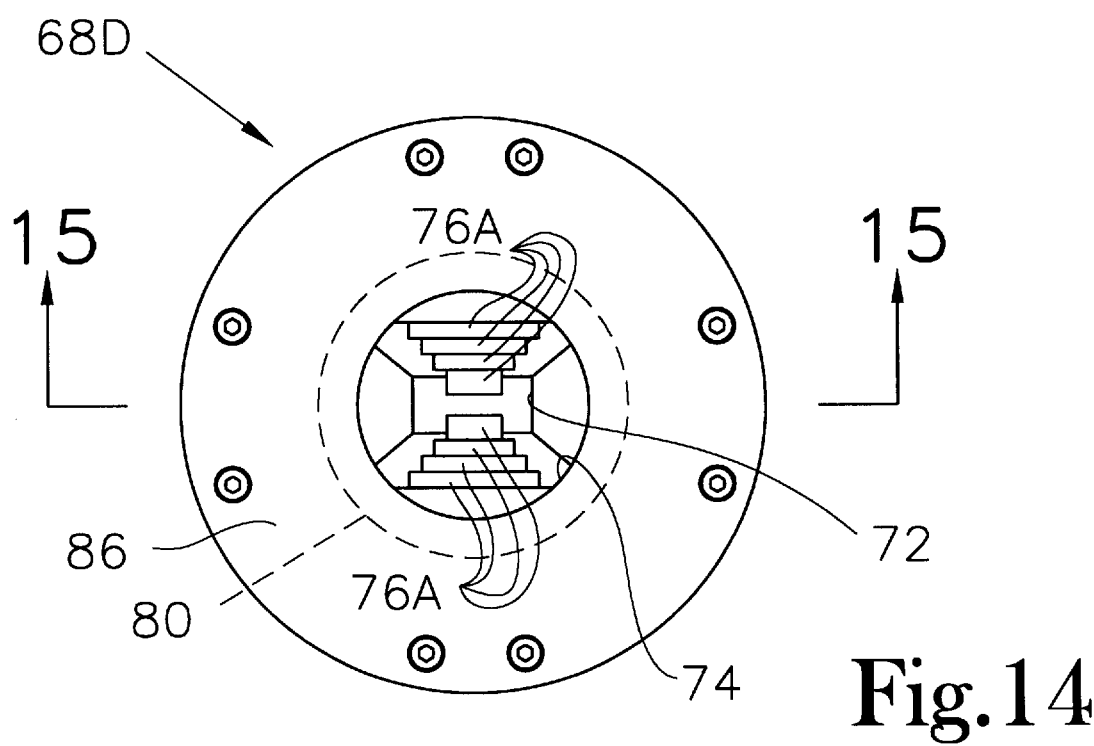
FIG. 14 is an end elevational view of an alternate embodiment of a tapered waveguide applicator showing the outlet opening thereof, wherein the inner wall defines a step taper and a dielectric window is included.

A further modification of the embodiment illustrated in FIGS. 12 and 13 is that embodiment illustrated in FIGS. 14 and 15. That embodiment further includes a dielectric window 80 secured in similar fashion to the embodiment of FIGS. 10 and 11.

It will be understood that when one operates microwave equipment, particularly at high power, it is necessary that the equipment be properly sealed or shielded to prevent the undesirable leakage of microwave radiation. It will be further appreciated that effective shielding becomes more difficult as the useful frequency range increases. For example, the common microwave oven operating at a fixed frequency of 2.45 GHz minimizes leakage by the use of a resonant, mechanical choke, which is ineffective at higher frequencies. Because the variable frequency microwave heating apparatus 10 of the present invention operates over a frequency range of greater than 5% bandwidth, microwave sealing techniques employed on conventional microwave ovens prove inadequate for meeting both personnel safety and communications-interference requirements.

FIG. 16 illustrates a front elevational view of an improved viewport 92 for visually observing sample conditions within the microwave cavity 34. The viewport 92 includes a "honeycomb" metal filter 94 in which the hex-cell diameter is small in relation to its depth. For example, one suitable proportion was found to be approximately 0.061 inches in diameter by 1.0 inch thick. This configuration provides at least 250 dB of attenuation at frequencies as high as 20 GHz. This filter 94 is placed between opposing plates 96 of transparent glass such as fused quartz to form the microwave seal for the viewport 92.

Figure 17A:
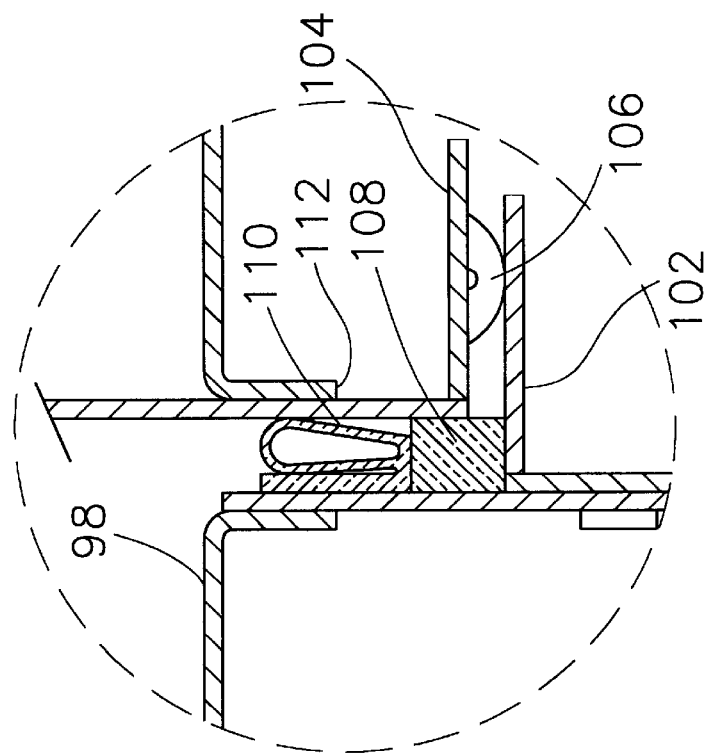
FIG. 17A is an enlarged view of a portion of the viewport of FIG. 17 more clearly illustrating the sealing mechanism for sealing the door of the microwave cavity used in accordance with the present invention.
Figure 17:
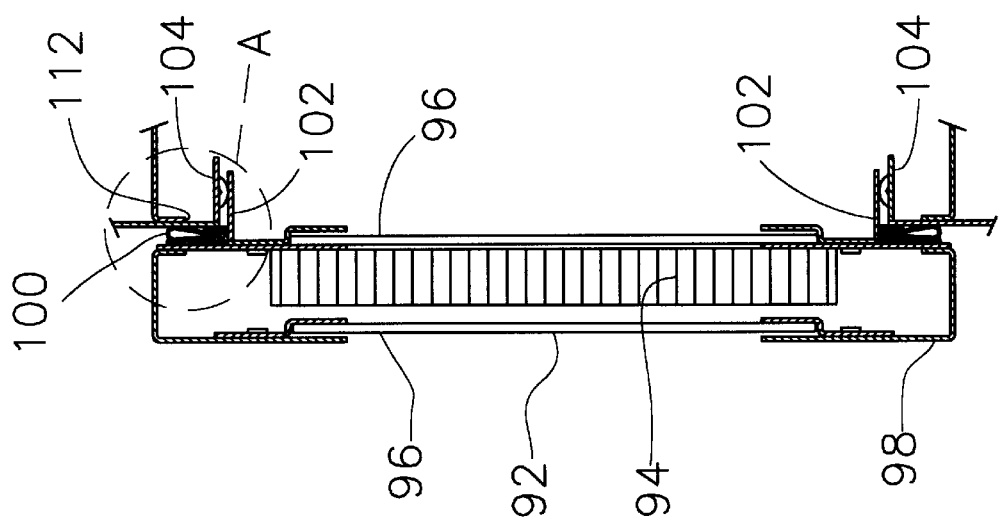
FIG. 17 is an end elevational view, in section, of the viewport of FIG. 16 taken along 17—17 thereof.

Because the microwave seal on the cavity door 98 is also essential to both personnel and communications protection, a four-stage microwave seal 100 is provided in the present invention as illustrated in FIG. 17, and more clearly in FIG. 17A. A two-ring seal 102,104 protrudes into the cavity 34 with one ring 102 attached to the door 98 and one ring 104 to the microwave furnace 32 inside the cavity 34. A spacing between the rings 102,104 acts as a cut-off waveguide, especially at frequencies below 4 GHz. One suitable spacing which has been determined is 0.06 inches. The ring seal 104 carried by the microwave furnace 32 inside the cavity 34 carries a compressible strip 106 such as beryllium copper which provides, in the illustrated embodiment, over 70 dB of attenuation at 10 GHz. The ring seal 102 carried by the door 98 compresses the strip 106 upon closure of the door 98. Carried around the door opening 112 on the cavity 34 is a compressible strip 108 such as monel mesh which is used as a slightly compressible door stop. The monel mesh 108 of the preferred embodiment provides an additional 80 dB of attenuation at 10 GHz. Finally, around the compressible strip 108 on the cavity 34 is a compressible strip 110 defining a substantially "e"-shaped cross-section. The compressible strip 110 of the preferred embodiment is a carbon-filled, silicone elastomer strip and is used to provide an additional 75 dB of attenuation at 10 GHz. The net result of this shielding of the viewport 92 and door 98 closure is that no detectable microwave leakage is measured from the variable frequency microwave heating apparatus cavity 34 at any frequency between 2.4 and 17.5 GHz. No microwave leakage has been detected even as great as 0.001 of the safe level. Those skilled in the art will recognize that the above-described microwave sealing configuration might well use various combinations of the techniques described depending upon the frequency range and power levels to be sealed and/or shielded against.

Figure 18:
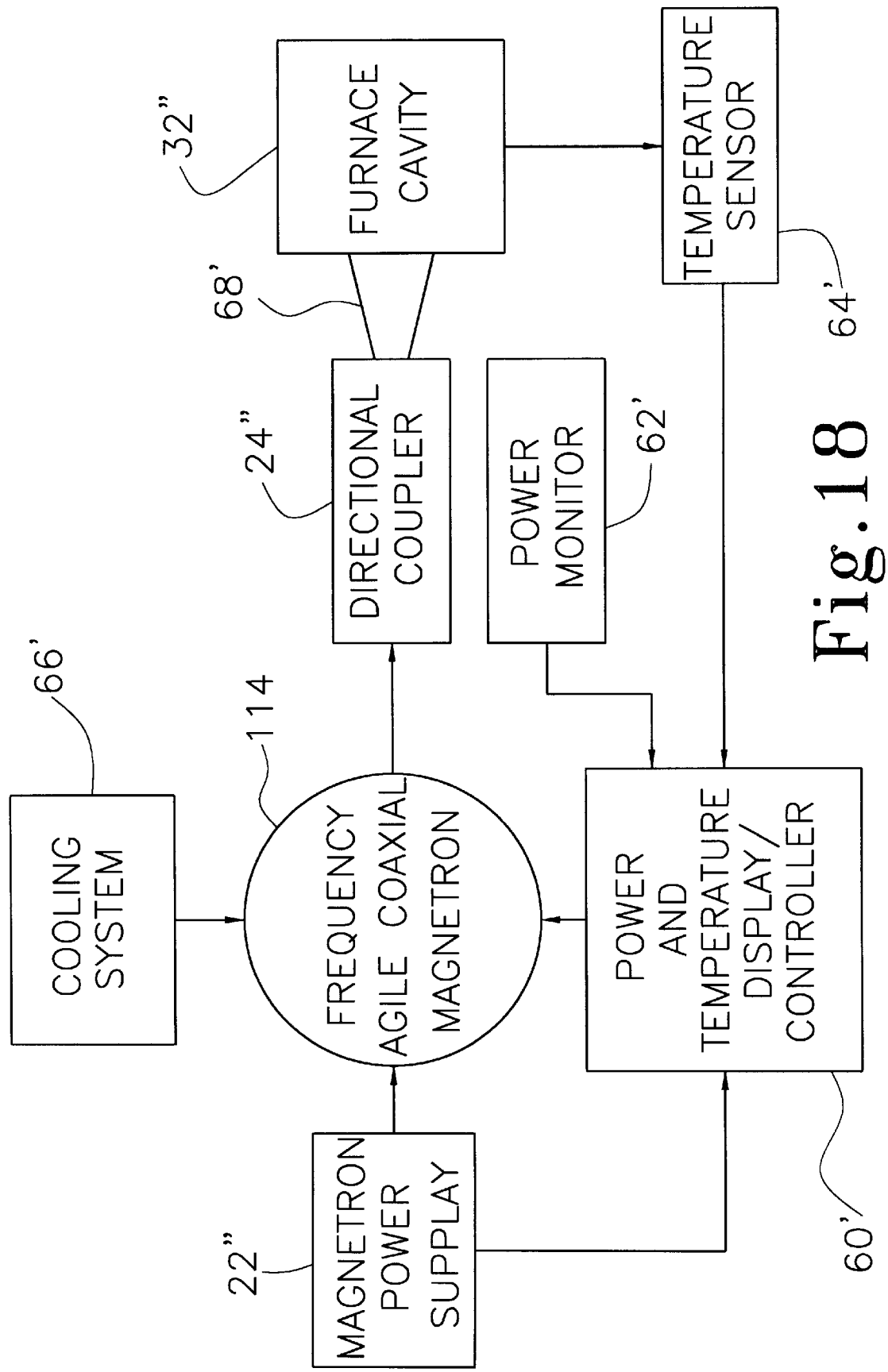
FIG. 18 illustrates a schematic diagram of another preferred embodiment of the variable frequency microwave heating apparatus of the present invention.

Illustrated in FIG. 18 is an alternate embodiment of the variable frequency microwave heating apparatus 10 of the present invention. In this alternate embodiment, a high-power oscillator 114 such as a frequency-agile coaxial magnetron is substituted for the microwave oscillator 14, the pre-amplifier power control 18 and the TWT 20 of the previously described embodiments. The magnetron 114 of the preferred embodiment has a usable bandwidth of at least 5% of its center frequency. The magnetron 114 is frequency-controlled either manually or, preferably, through a closed-loop, voltage-based feedback control system. In such a feedback control system, a low-level (0 to 10 V) signal is used to activate a servo-mechanism in the magnetron 114 which "tunes" the magnetron 114 from one frequency to another by precise repositioning of a plunger plate in the magnetron's coaxial cavity.

Figure 19:
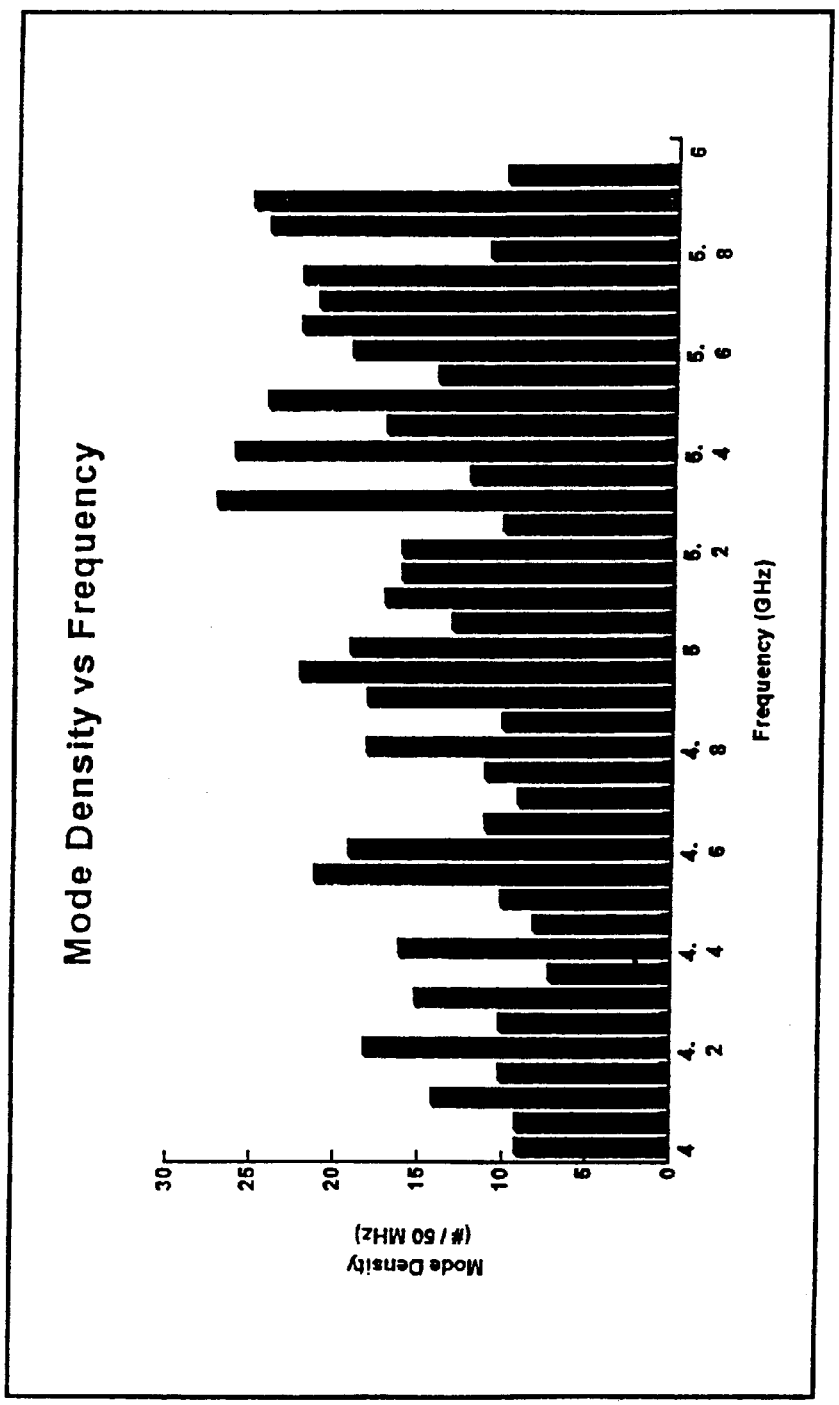
FIG. 19 is a graphical illustration of the mode density versus frequency for one rectangular microwave cavity used in accordance with the present invention.
Figure 20A:
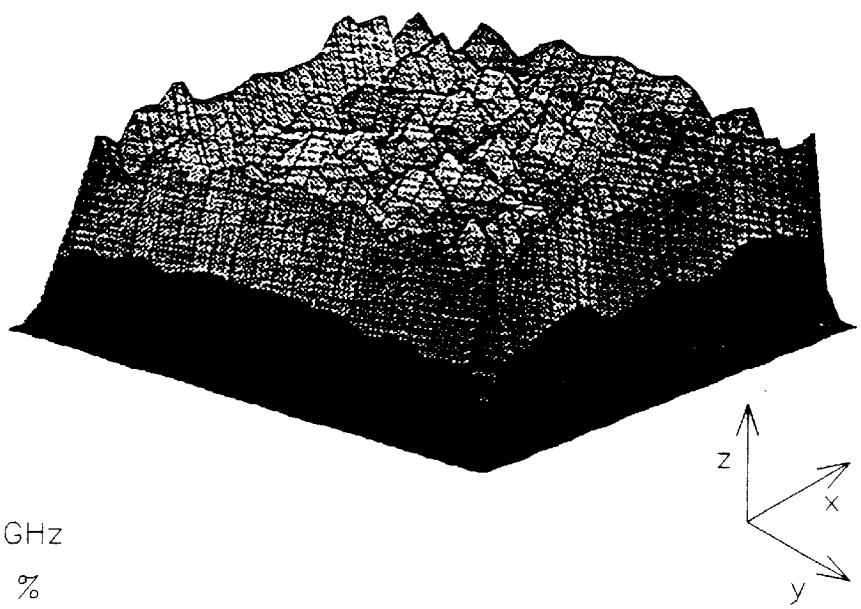
FIGS. 20A–D graphically illustrate power distributions in a theoretical model of a microwave cavity and a first microwave source used in accordance with several features of the present invention.
Figure 20B:
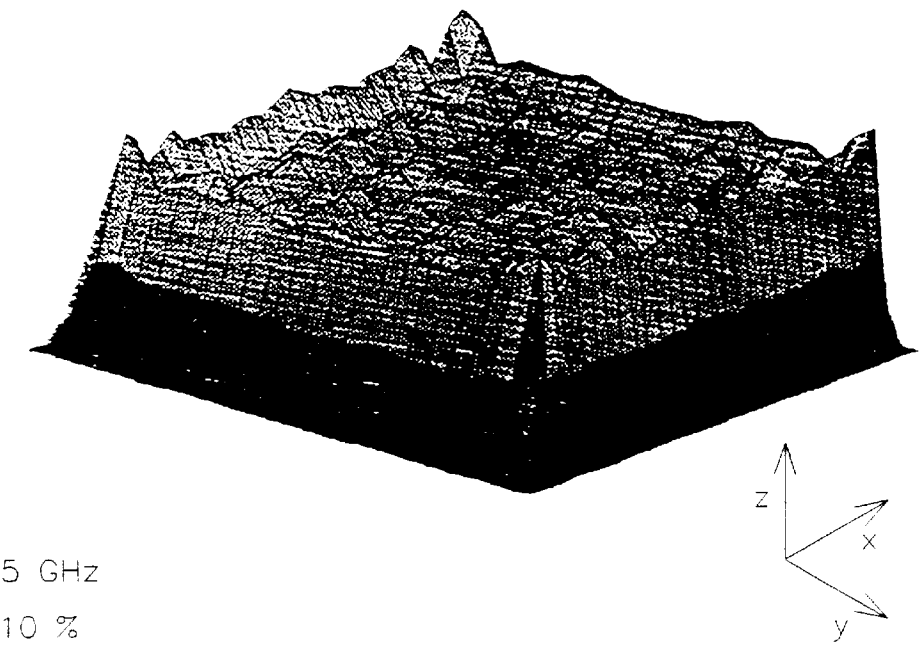
Figure 20C:
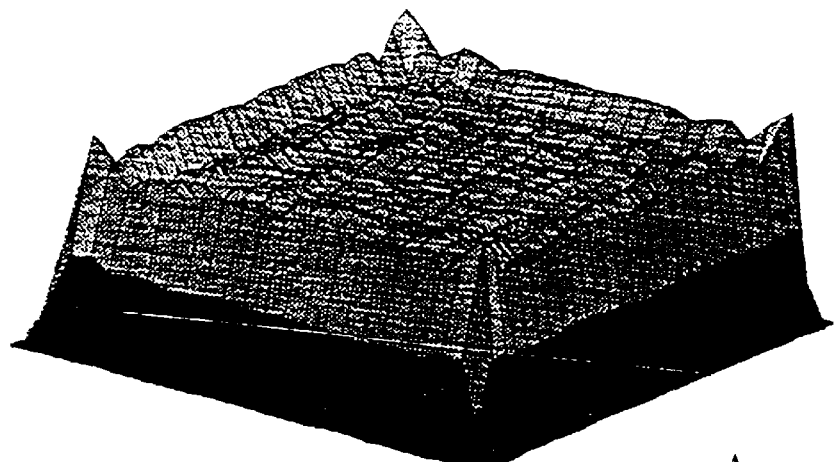
Figure 20D:
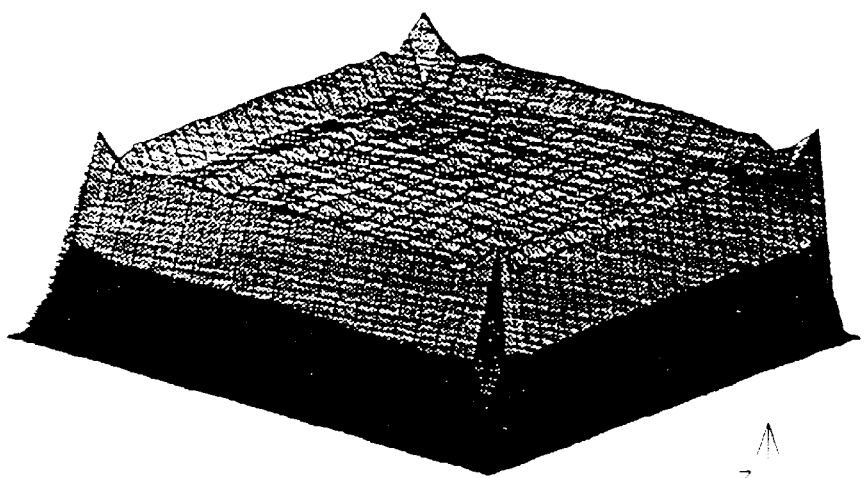
Figure 21A:
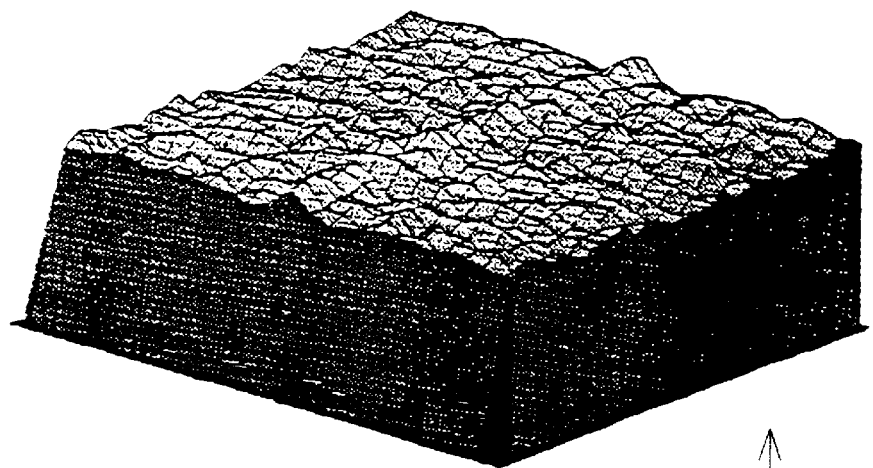
FIGS. 21A–F graphically illustrate power distributions in a theoretical model of a microwave cavity a second microwave source used in accordance with several features of the present invention.
Figure 21B:
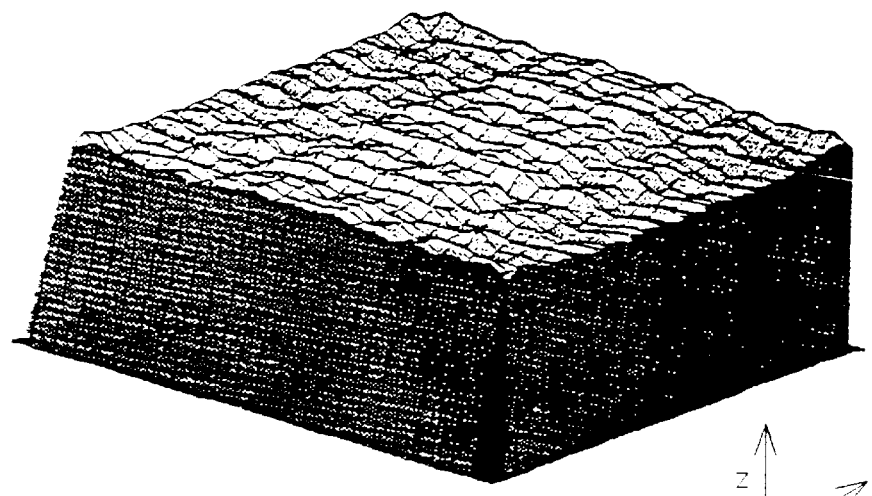
Figure 21C:
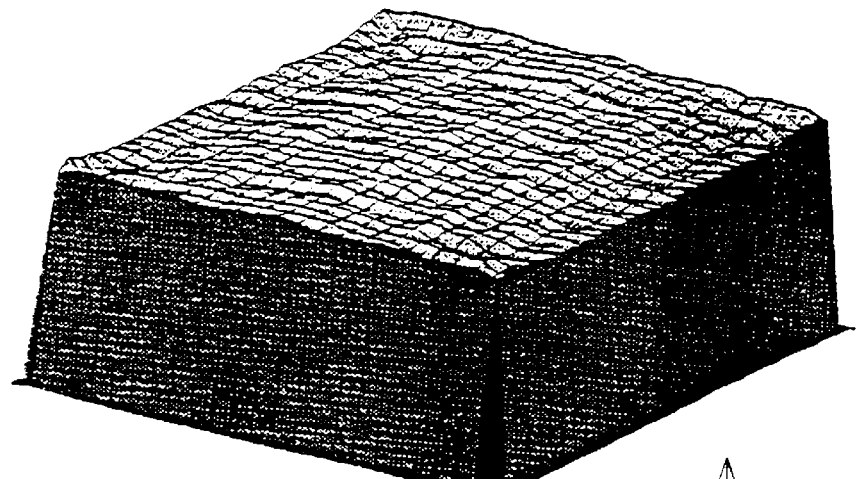
Figure 21D:
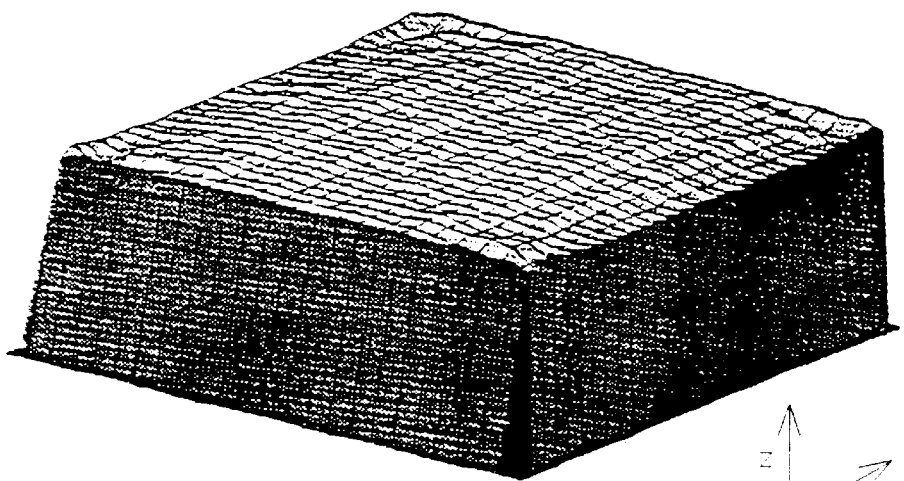
Figure 21E:
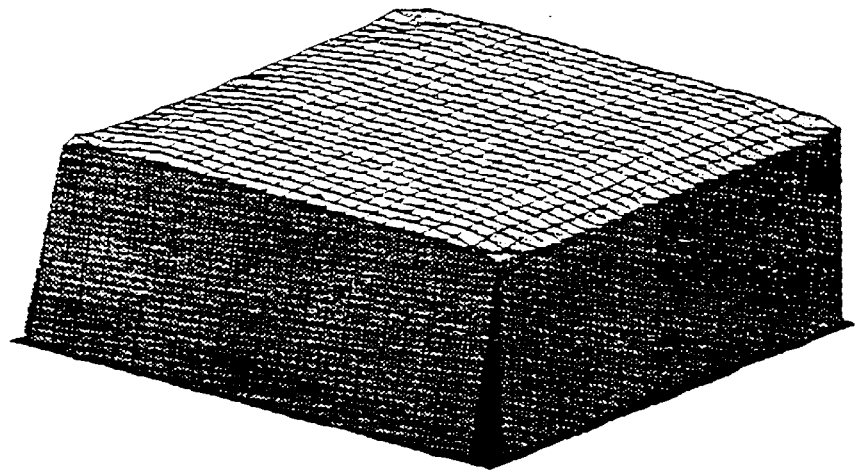
Figure 21F:
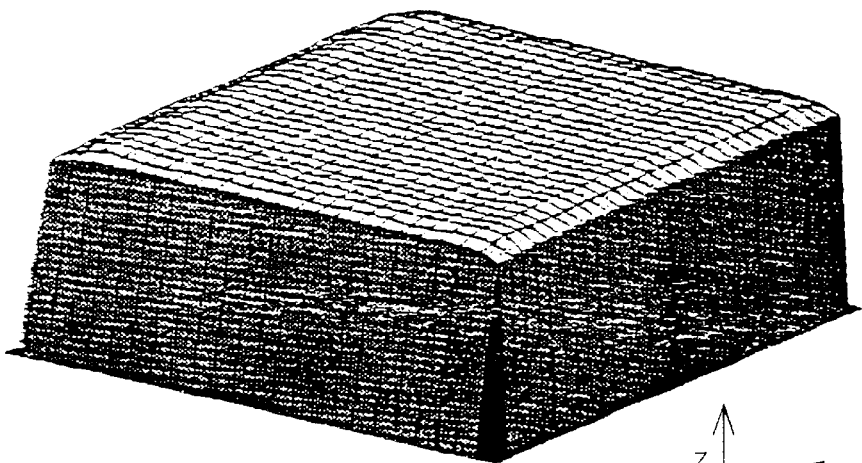

To better determine the limiting factor on required bandwidth, a theoretical model of a 12×12×10 inch rectangular microwave cavity 34 was constructed and used to determine the number of resonant modes capable of being supported in the cavity 34 over the 4 to 6 GHz frequency range. The results of these calculations clearly demonstrate that, even in a cavity 34 this small, there are an enormous number (over 600) of possible, closely-spaced modes (often 3 to 4 at a single frequency) over even the 4 to 6 GHz frequency range. These results have been graphically illustrated in FIG. 19 as mode density versus frequency. From these results, it is clear that a bandwidth of as little as 5% of the center frequency could, in some cases, provide sufficient mode plurality to provide relatively uniform energy distribution in the microwave cavity 34.

Using this theoretical model, power density was calculated as a function of location at various points along a horizontal midplane of the microwave cavity. The first case examined assumed a center frequency of 5 is GHz. As shown in the figures, as the percent bandwidth decreased, the power distribution became progressively less uniform, where bandwidth is defined as the difference between the high and low frequencies divided by the center frequency, or:

$$(f_{high} - f_{low})/f_{center}.$$

The power density for bandwidths greater than about 10% is fairly uniform, whereas the power density becomes somewhat less uniform for a 5% bandwidth. The second case assumed a center frequency of 15 GHz and power density was mapped for bandwidths ranging from 40% down to 1.3%. In this case, for a bandwidth as low as 2.5%, the power density was quite uniform compared to the previous case. Even when the bandwidth was further reduced to only 1.3%, the power density was sufficiently uniform for many microwave heating applications.

FIGS. 20A–D illustrate power maps using the above theoretical model and a center frequency of 5 GHz. A power map, as used in this context, is a three-dimensional graph showing the power at various points across the microwave cavity 34. The power is shown as the z-coordinate, with the x- and y-coordinates being the floor plan of the microwave cavity 34. The bandwidth for each respective map is 5%, 10%, 20%, and 40%. It will be noted that the power distribution throughout the microwave cavity 34 becomes more even as the bandwidth increases.

Similarly, FIGS. 21A–F illustrate power maps using the same theoretical model and a center frequency of 15 GHz. The respective bandwidths are 1.3%, 2.5%, 5%, 10%, 20%, and 40%. Again, for a bandwidth of 1.3%, the power distribution varies noticeably from point to point. However, for a useful bandwidth of 40%, the power distribution is substantially smooth.

The theoretical results have been tested to prove accuracy using thermal paper in a microwave cavity 34, with the microwave sources 12 being selected from those theorized. Hot spots, or locations having higher power distributions, caused the thermal paper to turn brown, while colder spots left the thermal paper white. The results of these tests confirmed those of the theoretical testing discussed above.

While several preferred embodiments have been shown and described, and several embodiments which have been constructed and tested have been specifically delineated, it will be understood that such descriptions are not intended to limit the disclosure, but rather it is intended to cover all modifications and alternate methods falling within the spirit and the scope of the invention as defined in the appended claims or their equivalents.

Having thus described the aforementioned invention,

We claim:

1. A variable frequency microwave heating apparatus for processing selected materials, said variable frequency microwave heating apparatus including a microwave furnace which defines a multi-mode cavity for processing said selected materials, and said variable frequency microwave heating apparatus comprising:

a microwave signal generator for generating a signal with a selected waveform, frequency, and amplitude;

a first signal amplifier for amplifying said signal generated by said signal generator, said first signal amplifier producing microwaves in a sweeping fashion through a selected useful bandwidth defining a center frequency, said microwaves having an associated power with a selected magnitude, said first signal amplifier comprising a microwave electron device wherein said useful bandwidth is at least five percent of said center frequency, whereby a plurality of independent microwave modes is established in said multi-mode cavity such that a substantially uniform time-averaged power density is created over a working volume of said multi-mode cavity;

a power supply for supplying power to said first signal amplifier; and a transmitter for conveying said microwaves produced by said first signal amplifier into said microwave furnace.

2. The variable frequency microwave heating apparatus of claim 1 wherein said microwave electron device is selected from the group consisting of a traveling wave tube, a twystron, a klystron, a crossed-field amplifier and a gyrotron.

3. The variable frequency microwave heating apparatus of claim 1 wherein said power supply is adjustable, thereby allowing said amplitude of said signal generated by said signal generator to be selectively modulated.

4. The variable frequency microwave heating apparatus of claim 1 further comprising a signal amplitude controller for selectively modulating said amplitude of said signal generated by said signal generator.

5. The variable frequency microwave heating apparatus of claim 1 further comprising a second amplifier for selectively amplifying said signal generated by said signal generator prior to amplification by said first amplifier.

6. The variable frequency microwave heating apparatus of claim 1 further comprising:

a signal director for directing said microwaves produced by said first amplifier and microwaves reflected from said microwave furnace; and a reflected load dissipator for dissipating said microwaves reflected from said microwave furnace, said microwaves reflected from said microwave furnace having an associated power and magnitude thereof.

7. The variable frequency microwave heating apparatus of claim 6 wherein said signal director is provided with a cooling device for dissipating heat accumulated through operation of said signal director.

8. The variable frequency microwave heating apparatus of claim 6 further comprising a system monitor for monitoring said magnitude of said power associated with said microwaves conveyed to said microwave furnace and said magnitude of said power associated with said microwaves reflected from said microwave furnace, said system monitor serving to monitor an efficiency of said variable frequency microwave heating apparatus.

9. The variable frequency microwave heating apparatus of claim 1 further comprising a pre-amplifier to achieve required levels of microwave power delivered into said microwave cavity with a selected drive level of said signal generator.

10. The variable frequency microwave heating apparatus of claim 1 wherein said transmitter comprises a waveguide applicator including a waveguide defined by an interior wall being smoothly tapered from an inlet to an outlet to provide free-space voltage standing wave ratio of at least 3:1 over a useful frequency band of said first signal amplifier.

11. The variable frequency microwave heating apparatus of claim 10 wherein said waveguide applicator further includes a dielectric window for protecting said variable frequency microwave heating apparatus when said multi-mode cavity is subjected to pressures other than ambient pressure.

12. The variable frequency microwave heating apparatus of claim 11 further comprising a cooling device for cooling said dielectric window.

13. The variable frequency microwave heating apparatus of claim 11 further comprising a cylindrical transition to match an impedance discontinuity between said waveguide and said dielectric window.

14. The variable frequency microwave heating apparatus of claim 1 wherein said transmitter comprises a waveguide applicator including a waveguide defined by an interior wall being tapered in a stepped fashion from an inlet to an outlet to provide free-space voltage standing wave ratio of at least 3:1 over a useful frequency band of said first signal amplifier.

15. The variable frequency microwave heating apparatus of claim 14 wherein said waveguide applicator further includes a dielectric window for protecting said variable frequency microwave heating apparatus when said multi-mode cavity is subjected to pressures other than ambient pressure.

16. The variable frequency microwave heating apparatus of claim 15 further comprising a cooling device for cooling said dielectric window.

17. The variable frequency microwave heating apparatus of claim 15 further comprising a cylindrical transition to match an impedance discontinuity between said waveguide and said dielectric window.

18. The variable frequency microwave heating apparatus of claim 1 further comprising a door disposed against a surface thereof and a seal to prevent leakage of said microwave signals, said surface defining an opening through which said selected materials are placed into and taken out of said multi-mode cavity, said seal being comprised of at least one chosen from the group consisting of: a first ring carried within said microwave cavity proximate to and extending away from said opening, a second ring carried by said door and dimensioned to be received within said first ring, and a compressible seal member carried between said first ring and said second ring such that a seal is formed when said ring is received by said first ring; at least one gasket carried by said door and positioned thereon to engage said surface of said multi-mode cavity to encircle said opening when said door is in a closed position; and at least one seal being fabricated from a compressible, microwave-absorbent polymeric material and being carried by said door and positioned thereon to engage said surface of said multi-mode cavity to encircle said opening when said door is in a closed position.

19. The variable frequency microwave heating apparatus of claim 1 wherein said multi-mode cavity further includes a viewport for observing said selected materials during processing, said viewport incorporating a microwave shield to prevent leakage of said microwave signals.

20. A variable frequency microwave heating apparatus for processing selected materials, said variable frequency microwave heating apparatus including a microwave furnace which defines a multi-mode cavity for processing said selected materials, and said variable frequency microwave heating apparatus comprising:

a microwave signal generator for generating microwaves in a sweeping fashion through a selected useful bandwidth defining a center frequency, each said microwave defining a selected waveform, frequency, and amplitude, said microwave signal generator being a frequency-agile coaxial magnetron wherein said useful bandwidth is at least five percent of said center frequency thereof, whereby a plurality of independent microwave modes is established in said multi-mode cavity such that a substantially uniform time-averaged power density is created over a working volume of said multi-mode cavity;

a power supply for supplying power to said microwave signal generator;

a transmitter for conveying said microwaves produced by said microwave signal generator into said multi-mode cavity.

21. The variable frequency microwave heating apparatus of claim 20 wherein said multi-mode cavity further includes a viewport for observing said selected materials during processing, said viewport incorporating a microwave shield to prevent leakage of said microwave signals.

22. The variable frequency microwave heating apparatus of claim 20 wherein said power supply is adjustable, thereby allowing said amplitude of said signal generated by said microwave signal generator to be selectively modulated.

23. The variable frequency microwave heating apparatus of claim 20 further comprising a signal frequency controller for controlling a frequency of oscillation of said coaxial magnetron.

24. The variable frequency microwave heating apparatus of claim 20 wherein said transmitter comprises a waveguide applicator including a waveguide defined by an interior wall being smoothly tapered from an inlet to an outlet to provide free-space voltage standing wave ratio of at least 3:1 over a useful frequency band of said coaxial magnetron.

25. The variable frequency microwave heating apparatus of claim 24 wherein said waveguide applicator further includes a dielectric window for protecting said variable frequency microwave heating apparatus when said multi-mode cavity is subjected to pressures other than ambient pressure.

26. The variable frequency microwave heating apparatus of claim 25 further comprising a cooling device for cooling said dielectric window.

27. The variable frequency microwave heating apparatus of claim 25 further comprising a cylindrical transition to match an impedance discontinuity between said waveguide and said dielectric window.

28. The variable frequency microwave heating apparatus of claim 20 wherein said transmitter comprises a waveguide applicator including a waveguide defined by an interior wall being tapered in a stepped fashion from an inlet to an outlet to provide a free-space voltage standing wave ratio of at least 3:1 over a useful frequency band of said coaxial magnetron.

29. The variable frequency microwave heating apparatus of claim 28 wherein said waveguide applicator further includes a dielectric window for protecting said variable frequency microwave heating apparatus when said multi-mode cavity is subjected to pressures other than ambient pressure.

30. The variable frequency microwave heating apparatus of claim 29 further comprising a cooling device for cooling said dielectric window.

31. The variable frequency microwave heating apparatus of claim 29 further comprising a cylindrical transition to match an impedance discontinuity between said waveguide and said dielectric window.

32. The variable frequency microwave heating apparatus of claim 20 further comprising a door disposed against a surface thereof and a seal to prevent leakage of said microwave signals, said surface defining an opening through which said selected materials are placed into and taken out of said multi-mode cavity, said seal being comprised of at least one chosen from the group consisting of: a first ring carried within said microwave cavity proximate to and extending away from said opening, a second ring carried by said door and dimensioned to be received within said first ring, and a compressible seal member carried between said first ring and said second ring such that a seal is formed when said ring is received by said first ring; at least one gasket carried by said door and positioned thereon to engage said surface of said multi-mode cavity to encircle said opening when said door is in a closed position; and at least one seal being fabricated from a compressible, microwave-absorbent polymeric material and being carried by said door and positioned thereon to engage said surface of said multi-mode cavity to encircle said opening when said door is in a closed position.

* * * * *